(12) United States Patent
Koo et al.

(10) Patent No.: US 12,149,074 B2
(45) Date of Patent: Nov. 19, 2024

(54) VIRTUAL POWER PLANT SYSTEM USING HEAT CONVERSION DEVICE AND VIRTUAL POWER PLANT OPERATING METHOD USING THE SAME

(71) Applicant: KOREA DISTRICT HEATING CORP., Seongnam-si (KR)

(72) Inventors: Ja Kyun Koo, Daejeon (KR); Tae Seon Eom, Seoul (KR); Yong Ha Lee, Hwaseong-si (KR); Min Sung Ko, Hwaseong-si (KR); Dong Hwan Chang, Gimpo-si (KR)

(73) Assignee: KOREA DISTRICT HEATING CORP., Seongnam-si (KR)

(*) Notice: Subject to any disclaimer, the term of this patent is extended or adjusted under 35 U.S.C. 154(b) by 337 days.

(21) Appl. No.: 17/634,537

(22) PCT Filed: May 10, 2021

(86) PCT No.: PCT/KR2021/005811
§ 371 (c)(1),
(2) Date: Feb. 10, 2022

(87) PCT Pub. No.: WO2021/230591
PCT Pub. Date: Nov. 18, 2021

(65) Prior Publication Data
US 2022/0285939 A1    Sep. 8, 2022

(30) Foreign Application Priority Data

May 15, 2020 (KR) ........................ 10-2020-0058705

(51) Int. Cl.
*H02J 3/00* (2006.01)
*G05B 19/042* (2006.01)
*H02J 3/38* (2006.01)

(52) U.S. Cl.
CPC ............ *H02J 3/004* (2020.01); *G05B 19/042* (2013.01); *H02J 3/381* (2013.01); *G05B 2219/2639* (2013.01); *H02J 2203/20* (2020.01)

(58) Field of Classification Search
CPC ...... H02J 13/00002; H02J 3/004; H02J 3/381; G05B 19/042; G05B 2219/2639; G06Q 50/06
See application file for complete search history.

(56) References Cited

U.S. PATENT DOCUMENTS 8,095,245 B1 * 1/2012 Mannepalli ............. F24S 50/00
700/297
8,903,561 B1 * 12/2014 Mannepalli ............. F24S 50/00
700/297

(Continued)

FOREIGN PATENT DOCUMENTS

JP    2013-198197 A    9/2013
JP    2015-073367 A    4/2015

(Continued)

OTHER PUBLICATIONS

International Search Report for PCT/KR2021/005811 mailed Aug. 17, 2021 from Korean Intellectual Property Office.

(Continued)

*Primary Examiner* — Vincent H Tran
(74) *Attorney, Agent, or Firm* — Revolution IP, PLLC

(57) ABSTRACT

A virtual power plant system using a heat conversion device includes a plurality of distributed energy resources connected to a virtual power plant; a virtual power plant output adjustment device connected to the virtual power plant and including a heat conversion device that receives power generated from the plurality of distributed energy resources and converts the power into thermal energy, a virtual power plant management device configured to conduct a bidding by predicting an expected power generation amount of the (Continued)

plurality of distributed energy resources, analyze output variation and error of the virtual power plant due to an output variation of the plurality of distributed energy resources, and stabilize an output variation of the virtual power plant by controlling a power consumption amount of the virtual power plant output adjustment device based on the analysis result.

14 Claims, 14 Drawing Sheets

(56) References Cited

U.S. PATENT DOCUMENTS

| | | | | |
|---|---|---|---|---|
| 9,124,098 | B2* | 9/2015 | Broniak | H02J 13/00017 |
| 10,530,163 | B2* | 1/2020 | Rodriguez | H02J 3/381 |
| 10,554,046 | B2* | 2/2020 | De Hoog | H02J 13/00007 |
| 11,070,058 | B2* | 7/2021 | Pavlovski | H02J 3/004 |
| 11,101,658 | B2* | 8/2021 | McDonnell | H02J 3/381 |
| 11,650,614 | B2* | 5/2023 | Vestesen | H02J 3/388 |
| | | | | 700/295 |
| 11,909,210 | B2* | 2/2024 | Harbaugh | G06Q 50/06 |
| 2007/0001461 | A1* | 1/2007 | Hopewell | H02J 3/381 |
| | | | | 290/44 |
| 2007/0132249 | A1* | 6/2007 | Andrew | F01K 3/00 |
| | | | | 290/52 |
| 2011/0055036 | A1* | 3/2011 | Helfan | G06Q 30/04 |
| | | | | 705/26.1 |
| 2012/0111386 | A1* | 5/2012 | Bell | H10N 10/00 |
| | | | | 700/297 |
| 2012/0271470 | A1* | 10/2012 | Flynn | H02J 3/381 |
| | | | | 700/292 |
| 2013/0146587 | A1* | 6/2013 | McDonald | H05B 1/02 |
| | | | | 219/494 |
| 2013/0218548 | A1* | 8/2013 | Lazaris | G05B 15/02 |
| | | | | 703/18 |
| 2014/0163755 | A1* | 6/2014 | Potter | H02J 3/381 |
| | | | | 700/287 |
| 2014/0297051 | A1* | 10/2014 | Zhang | H02J 7/34 |
| | | | | 700/287 |
| 2016/0011577 | A1* | 1/2016 | Schwarz | G05B 15/02 |
| | | | | 700/295 |
| 2016/0062380 | A1* | 3/2016 | Schwarz | G05F 1/66 |
| | | | | 700/295 |
| 2016/0211664 | A1* | 7/2016 | Subbotin | H02J 3/003 |
| 2017/0241296 | A1* | 8/2017 | Knop | F01K 3/18 |
| 2017/0241649 | A1* | 8/2017 | Cave | F28D 1/06 |
| 2019/0393723 | A1* | 12/2019 | Pavlovski | H02J 3/12 |
| 2021/0224903 | A1* | 7/2021 | Mathiesen-Ohman | H04L 9/50 |
| 2022/0108409 | A1* | 4/2022 | Schreck | H02J 3/008 |
| 2022/0285940 | A1* | 9/2022 | Koo | H02J 3/381 |
| 2022/0285942 | A1* | 9/2022 | Koo | H02J 3/28 |

FOREIGN PATENT DOCUMENTS

| | | |
|---|---|---|
| KR | 10-2019-0076572 A | 7/2019 |
| KR | 10-2020-0022255 A | 3/2020 |
| KR | 10-2020-0022947 A | 3/2020 |

OTHER PUBLICATIONS

Office Action of KR Patent Application No. 10-2020-0058705 mailed Sep. 27, 2021.

* cited by examiner

VIRTUAL POWER PLANT SYSTEM USING HEAT CONVERSION DEVICE AND VIRTUAL POWER PLANT OPERATING METHOD USING THE SAME

CROSS REFERENCE TO PRIOR APPLICATIONS

This application is the 35 U.S.C. 371 national stage of International application PCT/KR2021/005811 filed on May 10, 2021 which claims priority to Korean Patent Application No. 10-2020-0058705 filed on May 15, 2020. The entire contents of each of the above-identified applications are hereby incorporated by reference.

BACKGROUND OF THE INVENTION

(a) Field of the Invention

The present invention relates to a virtual power plant system using a heat conversion device and a virtual power plant operation method using the same.

(b) Description of the Related Art

Recently, the proportion of new renewable energy sources has been steadily increasing due to the depletion of fossil fuels and energy shortages. In addition, the proportion of new renewable energy sources is expanding worldwide in order to respond to the global climate crisis and secure industrial competitiveness. And, in order to supplement the existing centralized power supply method, a Distributed Energy Resource (DER) is being actively introduced into the power system.

The distributed energy resource can be installed on a small or medium scale near the load, can be installed in a short period of time, and has the advantage of being able to start within a short time. In addition, a virtual power plant (VPP) is an integrated management system for operating various types of distributed energy resources scattered within the power grid as a single power generation system using advanced information and communication technology and automatic control technology.

However, the distributed energy generation using a renewable energy source is difficult to control the output because the output changes rapidly depending on the climate and weather, and may cause an imbalance in power supply and demand due to the instantaneous output variability.

For example, when the power generation amount of the distributed energy generation exceeds the bidding generation amount due to a sudden increase in the output of the distributed energy resource, the frequency of the power system or the virtual power plant may be increased. In addition, an imbalance in power supply and demand may occur due to an excess of power supply. In addition, when the power generation amount of the distributed energy resource is lower than the bid generation amount due to a sharp decrease in the output of the distributed energy resource, the frequency of the power system is lowered, and there is a problem that an imbalance in power supply and demand occurs due to a lack of power supply.

Therefore, a method for stably operating the power system and the virtual power plant is required.

On the other hand, recently, a method of storing new renewable energy through an Energy storage system (ESS) or a pumped-water power plant and supplementing the insufficient amount of electricity is being studied.

However, ESS is expensive and economical is low. In addition, the ESS cannot store large-capacity power due to its capacity limitation, and this has made it difficult to supplement the insufficient amount of power in the power system. In addition, ESS also has a problem of low stability due to fire or explosion.

In addition, although the pumped-water power plant can store large-capacity power, it has low economic feasibility due to high installation and operating costs, and has difficulty in operating time as short as less than 2 hours. Further, the pumped-water power plant has a problem in that there are many restrictions on the installation site, the construction period is long, and it has a problem of destroying the surrounding environment.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide a virtual power plant system and a virtual power plant operation method capable of stabilizing the output of a virtual power plant by connecting a virtual power plant output adjustment device to a virtual power plant, and adjusting an output variation and error of the virtual power plant generated by a output variation of distributed energy resources with the virtual power plant output adjustment device.

An exemplary embodiment of the present invention provides a virtual power plant system using a heat conversion device, comprising: a plurality of distributed energy resources connected to a virtual power plant; a virtual power plant output adjustment device connected to the virtual power plant and including a heat conversion device that receives power generated from the plurality of distributed energy resources and converts the power into thermal energy, and a virtual power plant management device configured to conduct a bidding by predicting an expected power generation amount of the plurality of distributed energy resources, analyze output variation and error of the virtual power plant due to an output variation of the plurality of distributed energy resources, and stabilize an output variation of the virtual power plant by controlling a power consumption amount of the virtual power plant output adjustment device based on the analysis result.

The virtual power plant management device may analyze an expected power generation amount of each distributed energy resource based on characteristics and power generation capacity of each distributed energy resource, derive a VPP expected power generation amount generated in the virtual power plant by summing the expected power generation amount of the plurality of distributed energy resources, and determine a VPP bidding power generation amount based on the VPP expected power generation amount.

The virtual power plant management device may derive a VPP power generation amount generated in the virtual power plant by monitoring an amount of power generated by the plurality of distributed energy resources in real time, calculate a VPP expected output amount by subtracting a power consumption consumed by a load of the virtual power plant from the VPP power generation amount, and control a power consumption of the heat conversion device by comparing the VPP expected output amount and the VPP bidding power generation amount.

the virtual power plant management device may increase the power consumption of the heat conversion device by the difference between the VPP expected output amount and the VPP bidding power generation amount if the VPP expected output amount is greater than the VPP bidding power generation amount.

The virtual power plant management device may stop heat production of the heat conversion device if the VPP expected output amount is less than the VPP bidding power generation amount.

The virtual power plant management device may detect a system frequency of a power system in real time, and determines power consumption of the heat conversion device using the detected system frequency.

The virtual power plant management device may detect a zone frequency of the virtual power plant in real time, and determines power consumption of the heat conversion device using the detected zone frequency.

The virtual power plant management device may monitor an amount of power generation of individual distributed energy resource in real time, and adjust power consumption of the heat conversion device in real time based on the amount of power generation of the individual distributed energy resource.

The virtual power plant management device may determine an individual bidding power generation amount of an individual distributed energy resource by predicting an amount of power that can be generated by each distributed energy resource during a bidding period, and adjust power consumption of the heat conversion device by comparing the individual bidding power generation amount and an actual power generation amount of the individual distributed energy resource.

The virtual power plant management device may increase the power consumption of the heat conversion device in proportion to the difference between the actual power generation amount and the individual bidding power generation amount if the actual power generation amount of the individual distributed energy resource exceeds the individual bidding power generation amount during the bidding period.

The virtual power plant management device may divide the bidding period into a plurality of sections, derive a section average value of the actual power generation amount of individual distributed energy resources for each section, and control power consumption of the heat conversion device by comparing the section average value of each section for each section with the variable power source.

The distributed energy resource may include at least one of a wind power generator, a solar power generator, a geothermal power generator, a fuelbattery, a bio energy, a marine energy, or a variable power source whose output cannot be adjusted.

The virtual power plant management device may predict a power demand amount of a load disposed in the virtual power plant, and analyze an output variation and error of the virtual power plant based on the power demand amount.

The heat conversion device may store produced thermal energy in a large-capacity heat storage tank and provide it to a heat load disposed in the virtual power plant.

The virtual power plant management device may analyze a response amount at which the distributed energy resources can additionally generate power in order to respond to an output variation of a variable power source connected to the virtual power plant or a response rate at which the distributed energy resources can additionally generate power in order to respond to an output variation of the variable power source, and adjust power consumption of the virtual power plant output adjustment device if power supplying in the virtual power plant is smaller than the power demand of load disposed in the virtual power plant due to the decrease in the output of the variable power source, or if the response amount or the response rate of the distributed energy resources does not meet power demand amount of the load disposed in the virtual power plant.

An exemplary embodiment of the present invention provide a virtual power plant operation method using a heat conversion device, the method comprising: predicting an amount of power generation of distributed energy resource connected to the virtual power plant; analyzing output variation and error of the virtual power plant based on the amount of power generation of the distributed energy resource; and stabilizing output of the virtual power plant by adjusting heat production amount of the heat conversion device connected to the virtual power plant based on the analysis result.

The stabilizing output of the virtual power plant may adjust the heat production amount of the heat conversion device based on at least one of a VPP bidding power generation amount of the virtual power plant, a power generation amount of individual distributed energy resources, system information of a power system, or control signal received from outside of the virtual power plant.

The stabilizing output of the virtual power plant may include detecting a system frequency of the power system in real time, and adjusting heat production amount of the heat conversion device in real time based on the system frequency.

The stabilizing output of the virtual power plant may include detecting a zone frequency of the virtual power plant in real time, and adjusting heat production amount of the heat conversion device in real time based on the zone frequency.

The method may further include analyzing power generation amount of individual distributed energy resource in real time, and adjusting heat production amount of the heat conversion device in real time based on the amount of power generation of the individual distributed energy resource.

The method may further include determining an individual bidding power generation amount of an individual distributed energy resource by predicting power generation amount of the distributed energy resource that can be generated during the bidding period; monitoring amount of power generated by the individual distributed energy resource; and adjusting heat production amount of the heat conversion device by comparing the generation amount of the individual distributed energy resource and the individual bidding power generation amount so that the output value by the individual distributed energy resource during the bidding period maintains the individual bidding power generation amount.

The adjusting heat production amount of the heat conversion device may increase the heat production amount of the heat conversion device in proportion to the difference between the power generation amount and the individual bidding power generation amount if the amount of power generated by the individual distributed energy generation exceeds the individual bidding power generation amount during the bidding period.

The adjusting heat production amount of the heat conversion device may include dividing the bidding period into a plurality of sections; and deriving a section average value of an actual power generation amount of each distributed energy resource for each section.

The adjusting heat production amount of the heat conversion device may include controlling the heat production amount of the heat conversion device by comparing the section average value of each section for each of the plurality of sections with the individual bidding power generation amount.

The method may further include predicting a demand response of a load connected to the virtual power plant, and analyzing output variation and error of the virtual power plant based on the demand response of the load.

The method may further include analyzing a response amount at which the distributed energy resources can additionally generate power in order to respond to an output variation of a variable power source connected to the virtual power plant or a response rate at which the distributed energy resources can additionally generate power in order to respond to an output variation of the variable power source, and adjusting power consumption of the heat conversion device if the response amount or the response rate of the distributed energy resources does not meet power demand amount of the load disposed in the virtual power plant.

An exemplary embodiment of the present invention provide a virtual power plant operation method using a heat conversion device, the method comprising: deriving a VPP power generation amount by monitoring a power generation amount produced by a plurality of distributed energy resources connected to a virtual power plant; calculating a VPP expected output amount by subtracting power consumption from load of the virtual power plant from the VPP power generation; and controlling a heat production amount of the heat conversion device by comparing the VPP expected output amount and the VPP bidding power generation amount.

According to the exemplary embodiment of the present invention, the virtual power plant system and the virtual power plant operation method connects a virtual power plant output adjustment device to a virtual power plant, and adjusts an output variation and error of the virtual power plant due to a output variation of a distributed energy resources through the virtual power plant output adjustment device, thereby stabilizing the output of the virtual power plant.

Further, according to the present invention, the virtual power plant output adjustment device can produce heat energy by using the surplus power that is overproduced by the output fluctuation of the distributed energy resource. Through this, it is possible to minimize the output fluctuation of the virtual power plant due to the output fluctuation of the distributed energy resource, which is difficult to control the output such as a renewable energy source, and to maintain the output of the virtual power plant stably.

Further, the present invention provides an environment in which the waste of energy sources can be prevented by storing the heat energy produced in the virtual power plant output adjustment device in a large capacity and providing it to the heat load.

Further, the present invention may connect the renewable combined heat and power plant to the virtual power plant as a distributed energy resource, adjust the amount of power generation of the renewable combined heat and power plant in response to output fluctuations of the distributed energy resources, and supplement the insufficient output of the virtual power plant with the power generated in the renewable combined heat and power plant. Through this, it provides an environment in which the output of the virtual power plant can be stably maintained by minimizing the output shortage of the virtual power plant caused by distributed energy resources that are difficult to control output such as new and renewable energy sources and the output fluctuation of the virtual power plant.

Further, the present invention may analyze the predicted power generation amount of each individual distributed energy resource, derive the VPP predicted power generation amount by summing the predicted power generation amount of the distributed energy resources, and derive the VPP bidding power generation amount based on the VPP predicted power generation amount. Through this, the present invention provides an environment in which the optimal bidding power generation amount can be effectively determined.

Further, the present invention may derive the VPP power generation amount generated in real time within the virtual power plant by monitoring the amount of power generated from a plurality of distributed energy resources, and adjust the power consumption of the heat conversion device or the power generation of the renewable combined heat and power plant by comparing the VPP power generation amount and VPP bidding power generation amount. Through this, the present invention provides an environment capable of stably maintaining the output of the virtual power plant.

Further, the present invention may detect the system frequency of the power system or the zone frequency of the virtual power plant in real time, and control the power consumption of the heat conversion device or the amount of power generation of the renewable combined heat and power plant based on the detected frequency. Through this, the present invention provides an environment capable of preventing a sudden change in the system frequency of the power system and a sudden change in the zone frequency of the virtual power plant due to output fluctuations of distributed energy resources, which are variable power sources.

Further, the present invention may monitor the amount of power generation of individual distributed energy resources in real time, and control the power consumption of the heat conversion device or the power generation amount of the renewable combined heat and power plant by comparing the power generation amount of the individual distributed energy resources with the individual bidding power generation amount of the individual distributed energy resources. Through this, the present invention maintains the output of the individual distributed energy resource constant, and the output of the individual distributed energy resource is flattened and provided to the virtual power plant.

Further, the present invention may determine the individual bidding power generation amount of the individual distributed energy resource by predicting the power generation amount of individual distributed energy resources during the bidding period, compare the individual bidding power generation amount and the power generation amount of the individual distributed energy resource in real time, based on this, and control the power consumption of the heat conversion device or control the amount of power generated in the renewable combined heat and power plant in real time. Through this, the present invention provides an environment in which the output amount of individual distributed energy resources can be adjusted to the amount of individual bidding power generation during the bidding period.

Further, the present invention controls the operation of the virtual power plant output adjustment device based on at least one of the VPP bidding power generation amount with the power exchange, the power generation amount of individual distributed energy resources, system information of the power system, or a control signal received from the power exchange. Through this, the present invention provides an environment capable of stably maintaining the output of the virtual power plant and stably maintaining the power system.

DETAILED DESCRIPTION OF THE EMBODIMENTS

Figure 1:
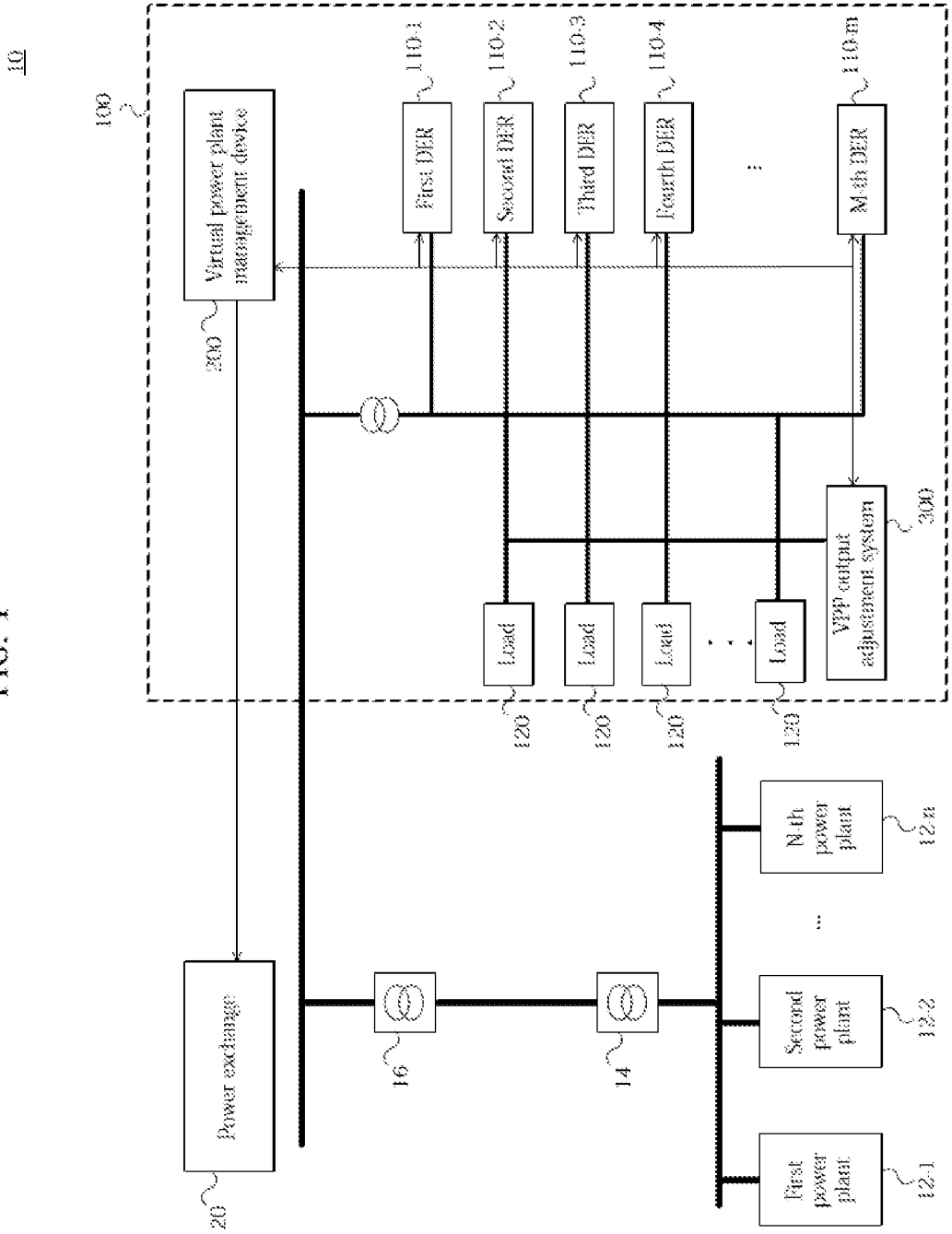
FIG. 1 is a diagram schematically illustrating a structure of a virtual power plant system using a virtual power plant output adjustment device according to an exemplary embodiment of the present invention.

An exemplary embodiment of the present invention will hereinafter be described in detail with reference to the accompanying drawings.

The scheme described in the specification is an exemplary embodiment of the present invention and it is to be understood that the invention is not limited to the disclosed embodiment, but, on the contrary, is intended to cover various modifications and equivalent arrangements included within the spirit and scope of the appended claims.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Further, in the drawings, a size and thickness of each element are randomly represented for better understanding and ease of description, and the present invention is not limited thereto and the thickness of layers, films, panels, regions, etc., are exaggerated for clarity.

In the entire specification, in addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation, and can be implemented by hardware components or software components, and combinations thereof.

In addition, unless defined otherwise in the detailed description, all the terms including technical and scientific terms have the same meaning as meanings generally understood by those skilled in the art to which the present invention pertains. Generally used terms such as terms defined in a dictionary should be interpreted as the same meanings as meanings within a context of the related art and should not be interpreted as ideally or excessively formal meanings unless clearly defined in the present specification.

Further, in the description of the present exemplary embodiment, if it is determined that the detailed description on the technology well-known in the art and the constitution may unnecessarily cloud the concept of the present invention, the detailed description thereof will be omitted herein.

Hereinafter, a virtual power plant system and a virtual power plant operation method using a virtual power plant output adjustment device according to an exemplary embodiment of the present invention will be described in detail with reference to FIGS. 1 to 14.

FIG. 1 is a diagram schematically illustrating a structure of a virtual power plant system using a virtual power plant output adjustment device according to an exemplary embodiment of the present invention. In this case, the power system 10 and virtual power plant system, only schematic configurations required for description according to the exemplary embodiment of the present invention are illustrated and the present invention is not limited to the configurations.

Referring to FIG. 1, a virtual power plant (hereinafter, VPP) system according to an exemplary embodiment of the present invention is connected with a power exchange (hereinafter, PX) 20 of a power system 10.

In addition, the virtual power plant system includes various types of Distributed Energy Resource (DER) 110 connected to the virtual power plant (VPP) 100. And, the virtual power plant system may supply the power produced from the distributed energy resource 110 to the power system 10.

In addition, the power exchange 20 operates electricity market to supply the power produced by the plurality of power plants 12-1 to 12-n of the power system 10 through the transmission substation 14 and the distribution substation 16 to power users.

In addition, the distributed energy resource 110 may include at least one of a wind power generator, a solar power generator, a geothermal power generator, a fuelbattery, a bio energy, a marine energy, or a variable power source whose output cannot be adjusted.

Further, the virtual power plant system may conduct a bidding with the power exchange 20, and supply some of the power produced by the plurality of distributed energy resources 110-1 to 110-m to the power system 10.

In addition, the virtual power plant system may conduct a bidding with the power exchange 20 through the virtual power plant management device 200. The virtual power plant management device 200 may determine a VPP bidding power generation amount supplied from the virtual power plant 100 to the power system 10. Herein, the VPP bidding power generation amount includes a power supply amount or power output amount supplied from the virtual power plant 100 to the power system 10 during the bidding period.

In addition, the virtual power plant system may supply some of the power produced by the plurality of the distributed energy resources 110-1 to 110-m connected to the virtual power plant 100 to the power system 10 according to the VPP bidding power generation amount.

For example, the virtual power plant management device 200 may execute a bid by predicting the amount of power generated by the plurality of distributed energy resources 110-1 to 110-m. In addition, the virtual power plant management device 200 may determine a VPP bidding power generation amount by subtracting the power consumption consumed by the load 120 in the virtual power plant 100 from the predicted power generation amount of the plurality of distributed energy resources 110-1 to 110-m.

Further, the virtual power plant management device 200 may analyze the output variation and error of the virtual power plant 100 due to the output variation of the plurality of distributed energy resources 110-1 to 110-m. In addition, the virtual power plant management device 200 may predict the power demand amount of the load disposed in the virtual power plant 100, and analyze the output variation and error of the virtual power plant 100 based on the power demand amount.

And, the virtual power plant management device 200 may stabilize the output fluctuation of the virtual power plant 100 by controlling the operation of the virtual power plant output adjustment system 300 based on the analysis result of the output variation and error of the virtual power plant 100.

The virtual power plant output adjustment system 300 may be disposed in the virtual power plant 100. In addition, the virtual power plant output adjustment system 300 may convert into heat by consuming power generated from a plurality of distributed energy resources 110-1 to 110-m connected to the virtual power plant 100 through the virtual power plant output adjustment device 310. Further, the virtual power plant output adjustment system 300 may generate power through the virtual power plant output control device 310 and supply it to the virtual power plant 100.

For example, the virtual power plant output adjustment device 310 may include a heat conversion device receiving a portion of the power produced from the plurality of distributed energy resources 110-1 to 110-m and converting it into thermal energy, and a renewable combined heat and power plant that generates electricity using a renewable energy source.

The heat conversion device and the renewable combined heat and power plant of the virtual power plant output adjustment device 310 have advantages of low cost and high responsiveness, unlike conventional ESS (Energy storage system) or pumped-water power plants. Further, the virtual power plant output adjustment device 310 is easy to install around the distributed energy resource 110 or the virtual power plant 100, and has the advantage of low restrictions on the installation area.

In addition, the virtual power plant management device 200 may analyze information on the amount of response that the distributed energy resources may additionally generate in order to respond to an output change of a variable power source connected to the virtual power plant 100.

Herein, the information on the amount of response may include a response amount at which the distributed energy resources connected to the virtual power plant 100 can additionally generate power in order to respond to an output variation of a variable power source (eg, a new renewable energy source) connected to the virtual power plant 100. And the information on the amount of response may include a response rate at which the distributed energy resources can additionally generate power in order to respond to an output variation of the variable power source.

In addition, the response amount includes the amount of power that the distributed energy resources connected to the virtual power plant 100 can additionally generate in order to respond to output fluctuations of the variable power source (eg, a new and renewable energy source) connected to the virtual power plant 100. And, the response rate includes a power generation rate at which distributed energy resources connected to the virtual power plant 100 can additionally generate power in response to an output change of the variable power source connected to the virtual power plant 100. In this case, the response amount and the response speed may include ramp rate characteristic information of the distributed energy resources.

And, when the output of the variable power is reduced and the power supply in the virtual power plant 100 is smaller than the power demand of a load disposed in the virtual power plant 100, the virtual power plant management device 200 may adjust the amount of power consumption or power generation of the virtual power plant output adjustment device 310. Also when the response amount or response speed of the distributed energy plants does not satisfy the power demand amount of the load disposed in the virtual power plant, the virtual power plant management device 200 may adjust the amount of power consumption or power generation of the virtual power plant output adjustment device 310.

For example, when the power supply in the virtual power plant 100 is smaller than the power demand of a load disposed in the virtual power plant 100 due to a decrease in the output of the variable power source, the heat conversion device of the virtual power plant output adjustment device 310 may control to reduce the amount of power consumption, or the renewable combined heat and power plant of the virtual power plant output adjustment device 310 may control to increase the amount of power generation. Alternatively, when the response amount or response speed of the distributed energy resources does not meet the power demand amount of the load disposed in the virtual power plant, the heat conversion device of the virtual power plant output adjustment device 310 may control to reduce the amount of power consumption, or the renewable combined heat and power plant of the virtual power plant output adjustment device 310 may control to increase the amount of power generation.

Further, to respond to the output change of the variable power source connected to the virtual power plant 100, the virtual power plant management device 200 may analyze the response amount information that the renewable combined heat and power plant of the virtual power plant output adjustment device 310 may additionally generate power.

And, when the output of the variable power connected to the virtual power plant 100 is reduced and the power supply in the virtual power plant 100 is smaller than the power demand of a load disposed in the virtual power plant 100, the virtual power plant management device 200 may control the heat production amount of the heat conversion device based on the response amount information of the renewable combined heat and power plant of the virtual power plant output adjustment device 310 or may control the power generation amount of the renewable combined heat and power plant.

Figure 2:
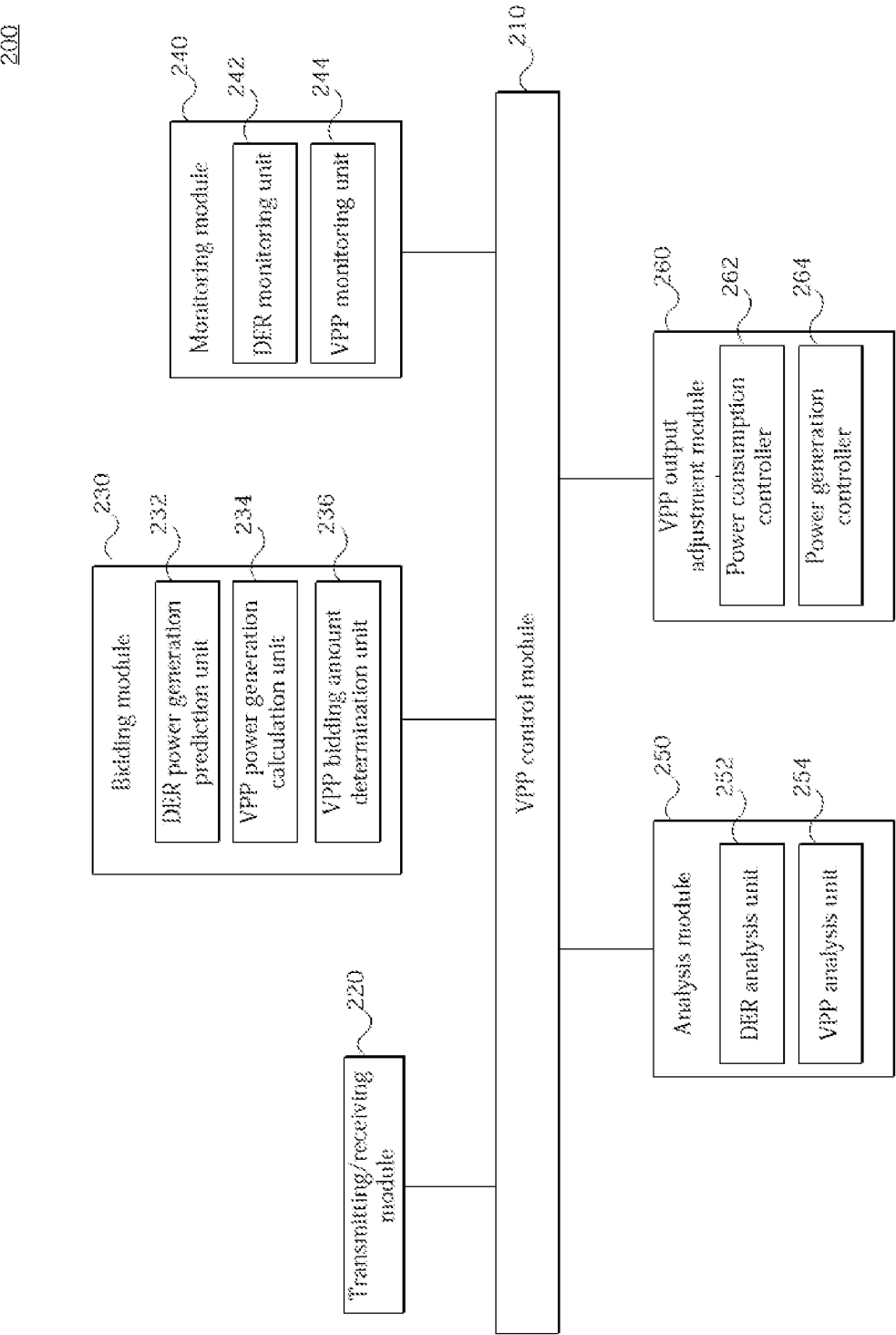
FIG. 2 is a block diagram showing a schematic configuration of a virtual power plant management device according to an exemplary embodiment of the present invention.

FIG. 2 is a block diagram showing a schematic configuration of a virtual power plant management device according to an exemplary embodiment of the present invention. In this case, the virtual power plant management device 200, only schematic configurations required for description according to the exemplary embodiment of the present invention are illustrated and the present invention is not limited to the configurations.

Referring to FIG. 2, a virtual power plant management device 200 according to an exemplary embodiment of the present invention predicts the expected power generation amount of a plurality of distributed energy resources 110-1 to 110-*m* connected to the virtual power plant 100, and proceeds a bidding with the power exchange 20.

In addition, the virtual power plant management apparatus 200 may analyze the output variation and error of the virtual power plant 100 due to the output variation of the plurality of distributed energy resources 110-1 to 110-*m*. Also, the virtual power plant management apparatus 200 may stabilize the output fluctuation of the virtual power plant 100 by controlling the VPP output adjustment system 300 based on the analysis result.

The virtual power plant management device 200 according to an exemplary embodiment of the present invention includes a VPP control module 210, a transmitting/receiving module 220, a bidding module 230, a monitoring module 240, an analysis module 250, and a VPP output adjustment module 260.

The VPP control module 210 may analyze the output variation and error of the virtual power plant 100 due to the output variation of the plurality of distributed energy resources 110-1 to 110-*m* and the demand variation of the load 120. Also, The VPP control module 210 may control the operation of each unit to stabilize the output fluctuation of the virtual power plant by controlling the VPP output adjustment system 300 based on the analysis result.

The transmitting/receiving module 220 may transmit virtual power plant information to the power exchange 20 and receive power system information and power system analysis information from the power exchange 20.

For example, the virtual power plant information includes power generation information of the plurality of distributed energy resources 110-1 to 110-*m*, power consumption information of the load 120, and the like. In addition, the transmitting/receiving module 220 may transmit the metered data measured by the virtual power plant 100 to the power exchange 20.

In addition, the transmitting/receiving module 220 may receive power system information and power system analysis information from the power exchange 20. Herein, the power system information and power system analysis information may include the ramp rate characteristic information of the generators 12 connected to the power system 10, the system frequency information of the power system 10, power supply and demand information of the power system 10, net load information by the variable power source of the power system 10, response amount information by the variable power source, new and renewable output fluctuation information connected to the power system 10, and reserve power of the power system 10 information, etc.

Herein, the ramp rate characteristic information is a change in generator output per minute, and includes an evaporation rate of a generator, a desensitization rate of a generator, or a speed adjustment rate of a generator.

And, the system frequency information of the power system 10 includes a real-time system frequency, a system frequency predicted value, a frequency change rate, or frequency sensitivity. The frequency change rate or frequency sensitivity includes the rate of change or degree of change of the system frequency with time.

And, the frequency change rate may have a positive value (+) or a negative value (−). For example, a case in which the frequency change rate is a positive number may include a case in which the system frequency rapidly increases. And, the case in which the frequency change rate is a negative number may include a case in which the system frequency is sharply decreased.

Further, the power supply and demand information of the power system 10 includes power supply and demand imbalance of the power system 10. Herein, the power supply and demand imbalance of the power system 10 may include a case where the deviation between the power supply and the power demand of the power system 10 exceeds the power supply and demand preset value due to a sudden change of a dropout of the generator connected to the power system 10, a sudden change in power demand of the power system 10, or the output of the variable power source 16 connected to the power system 10.

In addition, the net load information includes a value obtained by subtracting an output amount of a variable power source (eg, a renewable energy source) connected to the power system 10 from the total load amount of the power system 10.

Further, the response amount information may include a response amount value that the generators connected to the power system can additionally generate in order to respond to output fluctuations of a variable power source (eg, a renewable energy source) connected to the power system 10, or may include a response rate at which the generator can additionally generate power in response to fluctuations in the output of the variable power source.

The bidding module 230 may execute a bid with the power exchange 20 by predicting the expected power generation amount of the plurality of distributed energy resources 110-1 to 110-m. Further, the bidding module 230 may analyze the expected power generation amount of each distributed energy resource based on the characteristics and power generation capacity of each distributed energy resource. In addition, the bidding module 230 may derive the VPP predicted power generation amount by summing the predicted power generation amounts of the plurality of distributed energy resources 110-1 to 110-m.

Further, the bidding module 230 may conduct a bidding with the power exchange 20 based on the VPP expected generation amount and determine the VPP bidding power generation amount. Herein, the VPP expected power generation amount includes the amount of power generation that the plurality of distributed energy resources 110-1 to 110-m connected to the virtual power plant 100 are expected to generate during the bidding period. In addition, the VPP bidding power generation amount includes the power supply amount or power output amount supplied from the virtual power plant 100 to the power system 10 during the bidding period.

In addition, the bidding module 230 according to an exemplary embodiment of the present invention may include a distributed energy resource power generation prediction unit 232, a VPP power generation calculation unit 234, and a VPP bidding amount determination unit 236.

The distributed energy resource power generation prediction unit 232 may analyze the expected generation amount of each distributed energy resource based on the characteristics and generation capacity of each distributed energy resource. In addition, the distributed energy resource power generation prediction unit 232 may predict the amount of power generation that the plurality of distributed energy resources 110-1 to 110-m can generate at a specific point in time or during a bidding period based on the expected power generation amount of each distributed energy resource.

The VPP power generation calculation unit 234 may derive the VPP expected power generation amount that can be generated in the virtual power plant 100 by summing the predicted power generation amounts of the plurality of distributed energy resources 110-1 to 110-m.

In addition, the VPP bidding amount determination unit 236 may determine the VPP bidding generation amount based on the VPP expected power generation amount. Further, the VPP bidding generation determination unit 236 may determine the VPP bidding generation amount by subtracting the power consumption expected to be consumed by the load 120 of the virtual power plant 100 for a predetermined period from the VPP expected power generation amount.

The monitoring module 240 may monitor the power generation amount of the distributed energy resource 110 connected to the virtual power plant 100 and the power usage amount of the load 120 disposed in the virtual power plant 100 in real time.

For example, the monitoring module 240 may monitor the actual power generation amount of the plurality of distributed energy resources 110-1 to 110-m in real time. In addition, the monitoring module 240 may monitor the amount of power generation of the individual distributed energy resource 110, the amount of change in the amount of power generation, and the rate of change in the amount of power generation in real time.

Further, the monitoring module 240 may monitor in real time the amount of electricity used, the amount of change in the amount of electricity used and the rate of change in the amount of electricity used of the load 120 connected to the virtual power plant 100.

In addition, the monitoring module 240 according to an exemplary embodiment of the present invention may include a distributed energy resource monitoring unit 242 and a VPP monitoring unit 244.

The distributed energy resource monitoring unit 242 may monitor the actual power generation amount of the plurality of distributed energy resources 110-1 to 110-m connected to the virtual power plant 100 in real time. In addition, the distributed energy resource monitoring unit 242 may monitor the amount of power generation, the amount of change in the amount of power generation, and the rate of change in the amount of power generation of the individual distributed energy resource 110 in real time.

The VPP monitoring unit 244 may monitor the amount of power generation and power consumption of the virtual power plant 100 in real time. Further, the VPP monitoring unit 244 may monitor a total amount of power generated by the plurality of distributed energy resources 110-1 to 110-m of the virtual power plant 100 and a total amount of power used by the load 120 of the virtual power plant 100 in real time.

For example, the VPP monitoring unit 244 may monitor the amount of surplus power of the virtual power plant 100 in real time. Herein, the amount of surplus power may include a value obtained by subtracting the total amount of power generated by the load 120 of the virtual power plant 100 from the total power generated by the plurality of distributed energy resources 110-1 to 110-m of the virtual power plant 100.

In addition, the analysis module 250 may analyze the output variation of the individual distributed energy resource 110. Further, the analysis module 250 may analyze the output variation and error of the virtual power plant 100 due to the output variation of the plurality of distributed energy resources 110-1 to 110-m based on the virtual power plant information of the virtual power plant 100.

Further, the analysis module 250 may analyze changes in system frequency, power supply and demand imbalance, net load information, response amount information, and output information of the renewable energy source of the power system 10 based on the power system information received from the transmitting/receiving module 220.

In addition, the analysis module 250 according to an exemplary embodiment of the present invention may include a distributed energy resource analysis unit 252 and a VPP analysis unit 254.

The distributed energy resource analysis unit 252 may analyze the output variation of the individual distributed energy resource 110 and the output variation of the plurality of distributed energy resources 110-1 to 110-m based on the actual power generation amount of the plurality of distributed energy resources 110-1 to 110-m monitored by the monitoring module 240.

And, the VPP analysis unit 254 may analyze the output variation and error of the virtual power plant 100 due to the output variation of the plurality of distributed energy resources 110-1 to 110-m and the demand variation of the load 120.

Further, the VPP analysis unit 254 may analyze the output variation and error of the virtual power plant 100 due to the output variation of the plurality of distributed energy resources 110-1 to 110-*m* based on the amount of surplus power of the virtual power plant 100 monitored by the monitoring module 240.

In addition, the VPP analysis unit 254 may predict the demand response and power demand of the load 120 disposed in the virtual power plant 100, and analyze the output variation and error of the virtual power plant 100 based on the power demand.

The VPP output adjustment module 260 may control the operation of the virtual power plant output adjustment system 300 based on the analysis result of the analysis module 250. Specifically, the VPP output adjustment module 260 may control the amount of power consumption and power generation of the virtual power plant output adjustment device 310. Through this, the VPP output adjustment module 260 may adjust the amount of output provided from the virtual power plant 100 to the power system 10 and stabilize the output fluctuations of the virtual power plant 100.

Herein, the VPP output adjustment module 260 may control the amount of power consumption and power generation of the virtual power plant output adjustment device 310 by using at least one of the VPP bidding power generation amount, the zone frequency of the virtual power plant 100, the power generation amount of the individual distributed energy resource 110, the individual bidding power generation amount of the individual distributed energy resource 110, and power system information (eg, using at least one of grid frequency, power supply and demand information, reserve power, net load, response amount, new renewable output fluctuation, etc.), and control signals received from outside the virtual power plant (eg, power exchange).

Of course, the VPP output adjustment module 260 may control the amount of power consumption and power generation of the virtual power plant output adjustment device 310 by considering the VPP bidding power generation amount, the zone frequency of the virtual power plant 100, the power generation amount of the individual distributed energy resource 110, the individual bidding power generation amount of the individual distributed energy resource 110, and power system information (eg, using at least one of grid frequency, power supply and demand information, reserve power, net load, response amount, new renewable output fluctuation, etc.), and control signals received from outside the virtual power plant (eg, power exchange) in a complex manner.

In addition, the VPP output adjustment module 260 according to an exemplary embodiment of the present invention may include a power consumption controller 262 and a power generation controller 264.

The power consumption control unit 262 may control the power consumption or heat production of the virtual power plant output adjustment device 310 based on the VPP bidding power generation amount, the zone frequency of the virtual power plant 100, the power generation amount of the individual distributed energy resource 110, the individual bidding power generation amount of the individual distributed energy resource 110, power system information, and a control signal received from the outside of the virtual power plant, etc.

In addition, the generation amount control unit 254 may control the generation amount of the virtual power plant output adjustment device 310 based on the VPP bidding power generation amount, the zone frequency of the virtual power plant 100, the power generation amount of the individual distributed energy resource 110, the individual bidding power generation amount of the individual distributed energy resource 110, power system information, and a control signal received from the outside of the virtual power plant.

Figure 3:
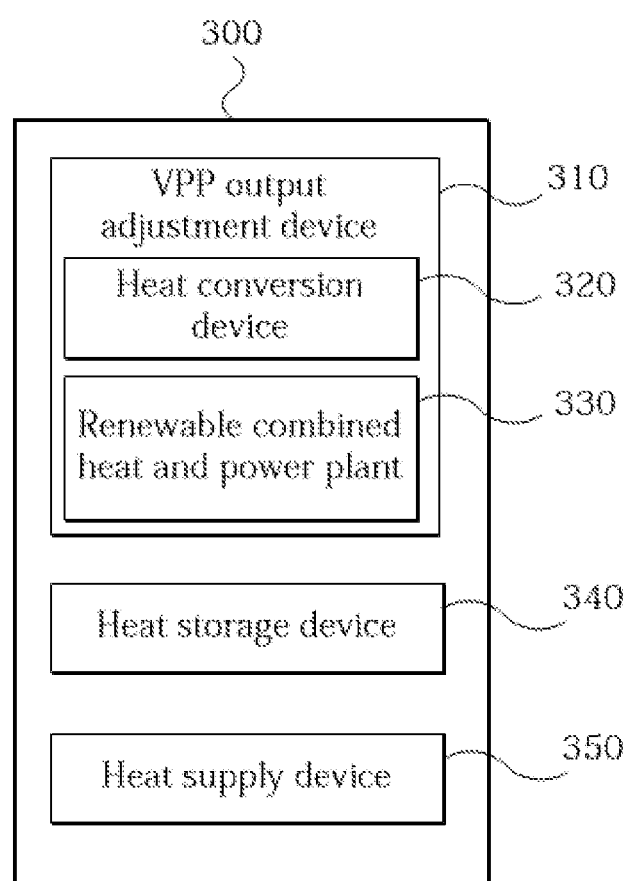
FIG. 3 is a block diagram showing a schematic configuration of a virtual power plant output adjustment system according to an exemplary embodiment of the present invention.

FIG. 3 is a block diagram showing a schematic configuration of a virtual power plant output adjustment system according to an exemplary embodiment of the present invention. In this case, the virtual power plant output adjustment system 300, only schematic configurations required for description according to the exemplary embodiment of the present invention are illustrated and the present invention is not limited to the configurations.

Referring to FIG. 3, a virtual power plant output adjustment system 300 according to an exemplary embodiment of the present invention may include a virtual power plant output adjustment device 310, a heat storage device 340, and a heat supply device 350.

In addition, the virtual power plant output adjustment device 310 according to an exemplary embodiment of the present invention may include a heat conversion device 320 and a renewable combined heat and power plant 330.

The heat conversion device 320 may receive the power generated from the plurality of distributed energy resources, and convert it into heat energy. In addition, the heat conversion device 320 may supply the converted heat energy to the heat storage device 340 or the heat supply device 350.

Herein, the heat conversion device 320 may include a boiler or an electric heater. In addition, the heat storage device 340 may include a heat storage tank for storing the heat energy. Further, the heat supply device 350 may include a heat pump for supplying the heat energy to a heat load, but the configuration of the present invention is not limited thereto.

In addition, the heat conversion device 320 may store the produced heat energy in a large-capacity heat storage tank and provide it to a heat load disposed in the power system 10 or the virtual power plant 100.

As described above, the present invention provides an environment capable of not only stabilizing the output of the virtual power plant but also preventing the waste of energy sources by storing the heat energy produced by the virtual power plant output adjustment device 310 in a large capacity and providing it to the heat load.

The renewable combined heat and power plant 330 is connected to the virtual power plant 100 and may generate electric power using a new and renewable energy source. In addition, the renewable combined heat and power plant 330 may supply the generated power to the virtual power plant 100 or the power system 10. In addition, the renewable combined heat and power plant 330 may generate power using at least one of a wood chip, a fuel cell, or by-product gas.

In addition, the virtual power plant management apparatus 200 may stabilize the output fluctuation of the virtual power plant due to the output fluctuation of the distributed energy resource 110 by controlling the power consumption and heat production amount of the heat conversion device 320 or by adjusting the power generation amount of the renewable heat and power plant 330.

For example, the virtual power plant management device 200 may control the power consumption amount of the heat conversion device 320 by comparing the VPP expected output amount with the VPP bidding power generation amount. Herein, the VPP expected output amount may include an amount of power expected to be supplied from the virtual power plant 100 to the power system 10 during a bidding period.

In addition, the virtual power plant management apparatus 200 may monitor the amount of power generated by the plurality of distributed energy resources in real time, and derive a VPP power generation amount generated in the virtual power plant 100 in real time. In addition, the VPP expected output amount may be calculated by subtracting the power consumption amount consumed by the load 120 of the virtual power plant 100 from the VPP power generation amount.

At this time, if the VPP expected output amount is greater than the VPP bidding power generation amount, the virtual power plant management device 200 may increase the power consumption of the heat conversion device 320 by the difference between the VPP expected output amount and the VPP bidding power generation amount.

Alternatively, when the VPP expected output amount is less than the VPP bidding power generation amount, the virtual power plant management device 200 may stop the heat production of the heat conversion device 320.

Further, the virtual power plant management device 200 may control the amount of power generation of the renewable combined heat and power plant 330 by comparing the VPP expected output amount with the VPP bidding power generation amount.

At this time, when the VPP expected output amount is smaller than the VPP bidding power generation amount, the virtual power plant management device 200 may increase the amount of power generation of the renewable combined heat and power plant 330 by the difference between the VPP expected output amount and the VPP bidding power generation amount.

In addition, the virtual power plant management device 200 may detect a system frequency of the power system in real time, and determine the power consumption of the heat conversion device 320 using the detected system frequency.

Of course, the virtual power plant management device 200 may detect the system frequency of the power system in real time, and control the amount of power generation of the renewable combined heat and power plant 330 using the detected system frequency.

In addition, the virtual power plant management device 200 may detect the zone frequency of the virtual power plant 100 in real time, and determine the power consumption of the heat conversion device 320 using the detected zone frequency.

Further, the virtual power plant management device 200 may detect the zone frequency of the virtual power plant 100 in real time, and control the amount of power generation of the renewable combined heat and power plant 330 using the detected zone frequency.

The virtual power plant management device 200 may monitor the amount of power generation of the individual distributed energy resource 110 in real time, and adjust the heat production amount of the heat conversion device 320 based on the amount of power generation of the individual distributed energy resource 110 in real time.

Further, the virtual power plant management device 200 may analyze the power generation amount of the individual distributed energy resource 110 in real time, and adjust the amount of power generation of the renewable combined heat and power plant 330 in real time based on the actual power generation amount of the individual distributed energy resource 110.

The virtual power plant management apparatus 200 may predict the amount of power generation of the individual distributed energy resources 110 that can be generated during the bidding period, and determine the individual bidding power generation amount of the individual distributed energy resources 110. And, the virtual power plant management device 200 may compare the individual bid generation amount and the actual generation amount of the individual distributed energy resource, and adjust the power consumption or heat production of the heat conversion device 320 based on the difference between the individual bidding power generation amount of the individual distributed energy resource 110 and the actual power generation amount.

For example, when the actual generation amount of the individual distributed energy resource 110 during the bidding period exceeds the individual bidding generation amount, the virtual power plant management device 200 may increase the amount of power consumption or heat production of the heat conversion device by the difference between the actual generation amount and the individual biding power generation amount.

In addition, the virtual power plant management device 200 may divide the bidding period into a plurality of sections, and derive a section average value of the actual power generation amount of the individual distributed energy resource 110 for each section. Then, the virtual power plant management device 200 may control the heat production amount of the heat conversion device 320 by comparing the average value of each section for each section with the individual bidding power generation amount.

Further, the virtual power plant management device 200 may predict the average power generation amount of the individual distributed energy resources 110 that can be generated during the bidding interval, and decide the individual bid power generation amount of the individual distributed energy resources 110 and based on the predicted average power generation amount.

In addition, the virtual power plant management device 200 may adjust the amount of power generation of the renewable cogeneration power plant 330 based on the actual power generation amount of the individual distributed energy generation power source 110 to maintain the output value of the individual distributed energy resource 110 as the individual bidding power generation amount during the bidding period.

For example, the virtual power plant management device 200 may increase the amount of power generation of the renewable combined heat and power plant 330 when the average value of the actual power generation by the individual distributed energy resources during the bidding period is smaller than the individual bidding power generation amount.

Further, the virtual power plant management device 200 may divide the bidding period into a plurality of sections, and derive a section average value of the actual power generation amount of the individual distributed energy resource 110 for each section. Then, the virtual power plant management device 200 may control the amount of power generation of the renewable combined heat and power plant 330 by comparing the average value of each section for each section with the individual bidding power generation amount.

Figure 4:
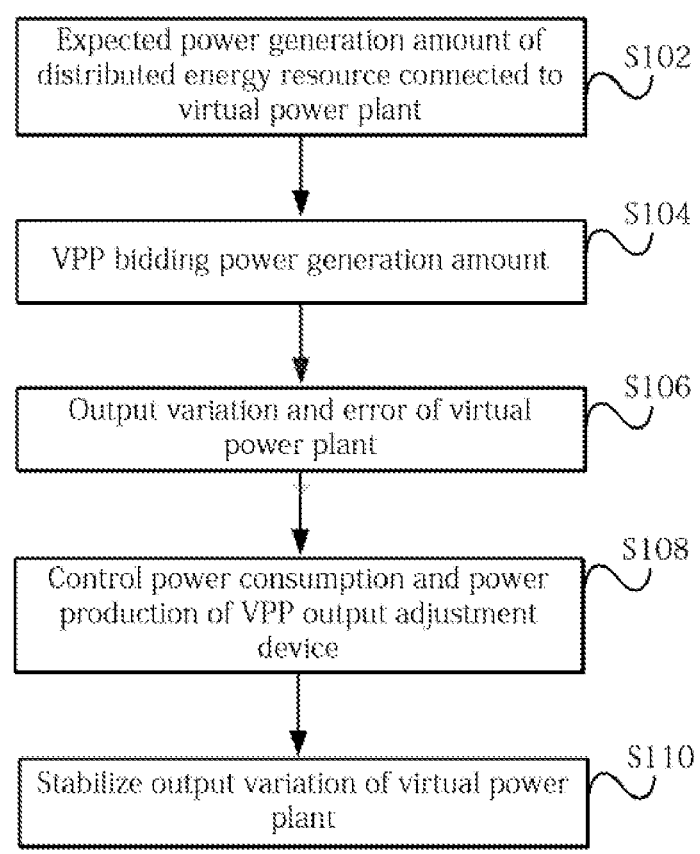
FIG. 4 is a flowchart briefly showing a process of conducting a bid by predicting the amount of power generation of distributed energy resource connected to a virtual power plant, and stabilizing the output of the virtual power plant by controlling the virtual power plant output adjustment device according to an exemplary embodiment of the present invention.

FIG. 4 is a flowchart briefly showing a process of conducting a bid by predicting the amount of power generation of distributed energy resource connected to a virtual power plant, and stabilizing the output of the virtual power plant by controlling the virtual power plant output adjustment device according to an exemplary embodiment of the present invention. Hereinafter, the following flow chart will be described by using the same reference numerals which are attached to components of FIG. 1 to FIG. 3.

Referring to FIG. 4, the virtual power plant management device 200 according to an exemplary embodiment of the present invention predicts the expected power generation amount of a plurality of distributed energy resources 110-1 to 110-m connected to the virtual power plant 100 at step S102. Herein, the virtual power plant management device 200 may predict the expected power generation amount of each distributed energy resource based on the characteristics and power generation capacity of each distributed energy resource.

In addition, the virtual power plant management device 200 may conduct a bidding with the power exchange 20 and determine the VPP bidding power generation amount supplied from the virtual power plant 100 to the power system 10 at step S104.

Herein, the virtual power plant management device 200 may derive the VPP expected generation amount by summing the predicted generation amount of the plurality of distributed energy resources 110-1 to 110-m, and determine the VPP bidding power generation amount by conducting a bidding with the power exchange 20 based on the VPP expected generation amount.

For example, the VPP expected power generation amount may include a VPP minimum power generation amount and the VPP maximum power generation amount that the plurality of distributed energy resources 110-1 to 110-m connected to the virtual power plant 100 can generate at a specific point in time or during a bidding period. And, the VPP bidding power generation amount may be determined as a value between the VPP minimum power generation amount and the VPP maximum power generation amount.

Then, the virtual power plant management device 200 may analyze the output variation and error of the virtual power plant 100 due to the output variation of the plurality of distributed energy resources 110-1 to 110-m at step S106.

In addition, the virtual power plant management device 200 may control the power consumption and power production of the virtual power plant output adjustment device 310 based on the analysis result at step S108.

Herein, the virtual power plant management device 200 may control the operation of the virtual power plant output adjustment device 310 based on at least one of the VPP bidding power generation with the power exchange 20, the power generation amount of the individual distributed energy resource 110, and system information of the power system 10 (eg, frequency, power supply and demand, reserve power, net load amount, response amount, new renewable output fluctuation, etc.), or a control signal received from the outside (eg, power exchange) of the virtual power plant 100.

In addition, the virtual power plant management device 200 may stabilize the output variation of the virtual power plant 100 by adjusting the output variation and error of the virtual power plant 100 through the operation of the virtual power plant output adjustment device 310 at step S110.

For example, the present invention produces heat energy with the virtual power plant output adjustment device 310 by using the surplus power of the virtual power plant 100 to, and provides the produced thermal energy to a heat load, through this, the output of the virtual power plant 100 can be stabilized.

Further, the present invention may stabilize the output of the virtual power plant 100 by supplementing the insufficient output of the virtual power plant 100 with the power generated by the virtual power plant output adjustment device 310.

Figure 5:
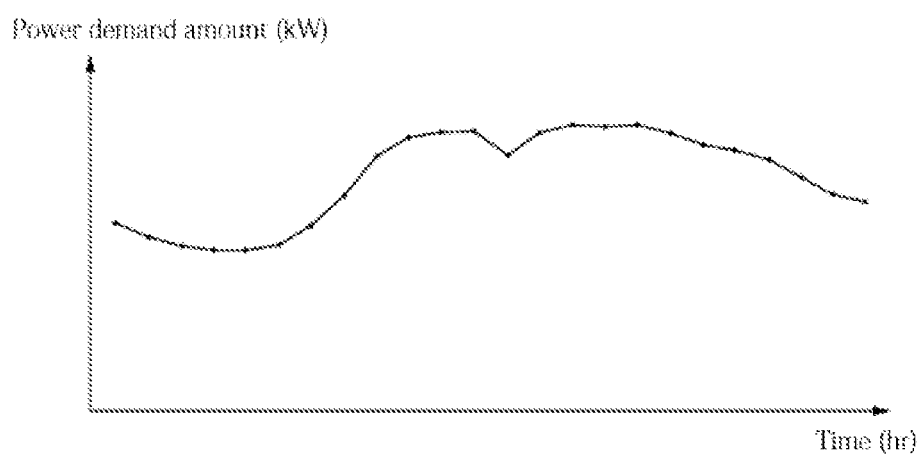
FIG. 5 is a graph showing a typical daily power demand curve in the power system.
Figure 6:
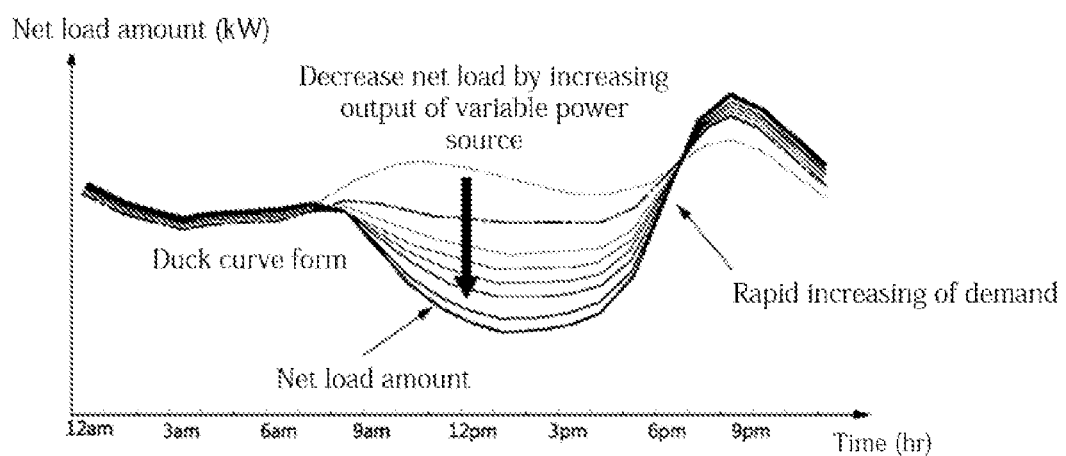
FIG. 6 is a graph illustrating a change in a net load amount due to an increase in output of a variable power supply.

FIG. 5 is a graph showing a typical daily power demand curve in the power system, and FIG. 6 is a graph illustrating a change in a net load amount due to an increase in output of a variable power supply.

Referring to FIG. 5 and FIG. 6, when the output variability of the variable power connected to the power system 10 or the distributed energy resource connected to the virtual power plant 100 increases, the net load is formed in the form of a duck curve.

In particular, when the proportion of the variable power source (for example, a renewable energy source) connected to the power system 10 or the virtual power plant 100 is increased, the power demand curve is expected to change in a pattern different from the existing power demand curve due to the phenomenon that the power load decreases sharply after sunrise and the power load increases rapidly after sunset. In addition, when the duck-curve phenomenon intensifies, it is expected that the power demand forecasting error increases and the pharmaceutical cost increases.

For example, a wind power generator, which is a renewable energy source, has an output greatly influenced by wind speed, and a solar power generator has an output dependent on the amount of insolation of a photovoltaic module. In addition, the output of renewable energy sources such as wind power and solar power is increased during the daytime, and for this reason, the net load of the power system 10 or the virtual power plant 100 obtained by subtracting the output of the renewable energy source from the total load of the power system 10 or the virtual power plant 100 is greatly reduced.

In particular, when the renewable energy source is connected to the power system 10 or the virtual power plant 100 during the daytime of the season when the output variability of the renewable energy source is large, there is a problem that causes an imbalance in power supply and demand of the power system 10 or the virtual power plant 100, and the system frequency of the power system 10 or the zone frequency of the virtual power plant 100 becomes unstable.

Therefore, the present invention connects the virtual power plant output adjustment device 310 to the virtual power plant 100, and by adjusting the power consumption and generation amount of the virtual power plant output adjustment device 310 consumes the surplus power of the virtual power plant 100 or supplements the insufficient output of the virtual power plant 100. Through this, the present invention provides an environment capable of resolving output fluctuations and errors of the virtual power plant caused by output fluctuations of distributed energy resources, and stabilizing the output of the virtual power plant.

Figure 7:
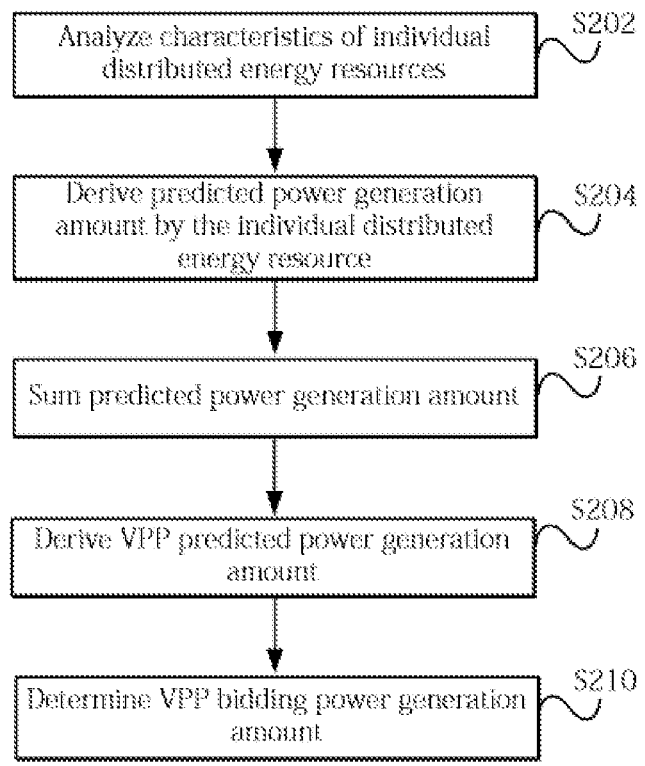
FIG. 7 is a flowchart briefly showing a process of deriving a VPP expected power generation amount based on the expected power generation amount of individual distributed energy resources and determining a VPP bidding power generation amount using the derived VPP expected power generation amount according to an exemplary embodiment of the present invention.

FIG. 7 is a flowchart briefly showing a process of deriving a VPP expected power generation amount based on the expected power generation amount of individual distributed energy resources and determining a VPP bidding power generation amount using the derived VPP expected power generation amount according to an exemplary embodiment of the present invention. Hereinafter, the following flow chart will be described by using the same reference numerals which are attached to components of FIG. 1 to FIG. 3.

Referring to FIG. 7, the virtual power plant management device 200 according to an exemplary embodiment of the present invention analyzes characteristics of the individual distributed energy resources 110 at step S202. Herein, the individual distributed energy resource may include at least one of a wind power generator, a solar power generator, a geothermal generator, a fuel cell, bio-energy, marine energy, or a variable power source whose output cannot be adjusted.

In addition, the virtual power plant management device 200 may derive the expected amount of power generated by the individual distributed energy resources 110 during a predetermined period (eg, a bidding period) based on the characteristics of the individual distributed energy resources 110 at step S204.

In addition, the virtual power plant management device 200 may derive the VPP predicted power generation amount by summing the predicted power generation amounts of the plurality of distributed energy resources 110-1 to 110-$m$ at steps S206 and S208. Herein, the VPP expected power generation amount includes the amount of generation that the plurality of distributed energy resources 110-1 to 110-$m$ connected to the virtual power plant 100 can generate at a specific point in time or during a bidding period.

In addition, the virtual power plant management device 200 may determine the VPP bidding power generation amount output from the virtual power plant 100 to the power system 10 during the bidding period at step S210. Herein, the VPP bidding power generation amount includes the power supply amount or power output amount supplied from the virtual power plant 100 to the power system 10 during the bidding period.

Figure 8:
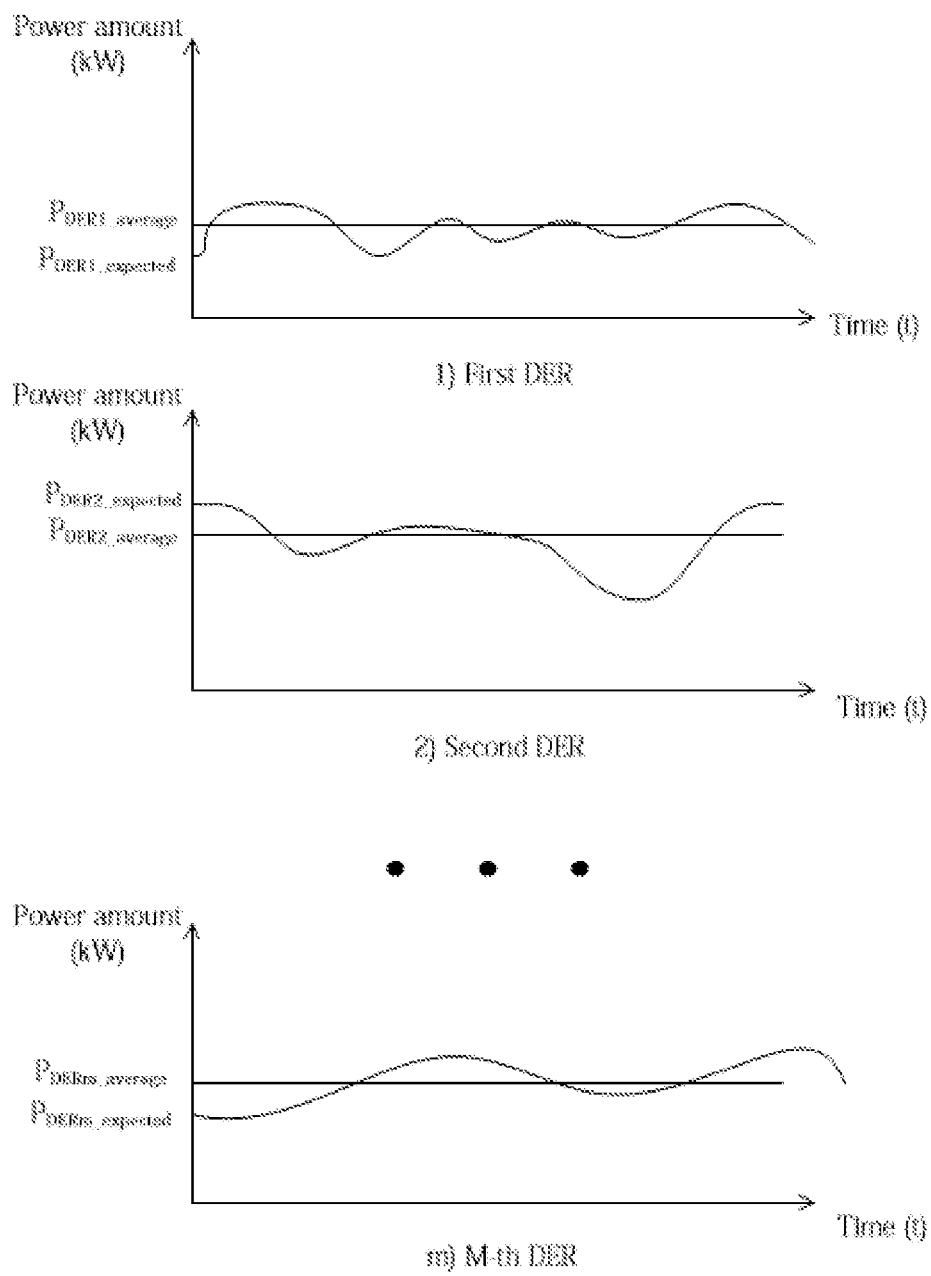
FIG. 8 is a graph showing an expected power generation amount and average generation amount of individual distributed energy resources according to an exemplary embodiment of the present invention.
Figure 9:
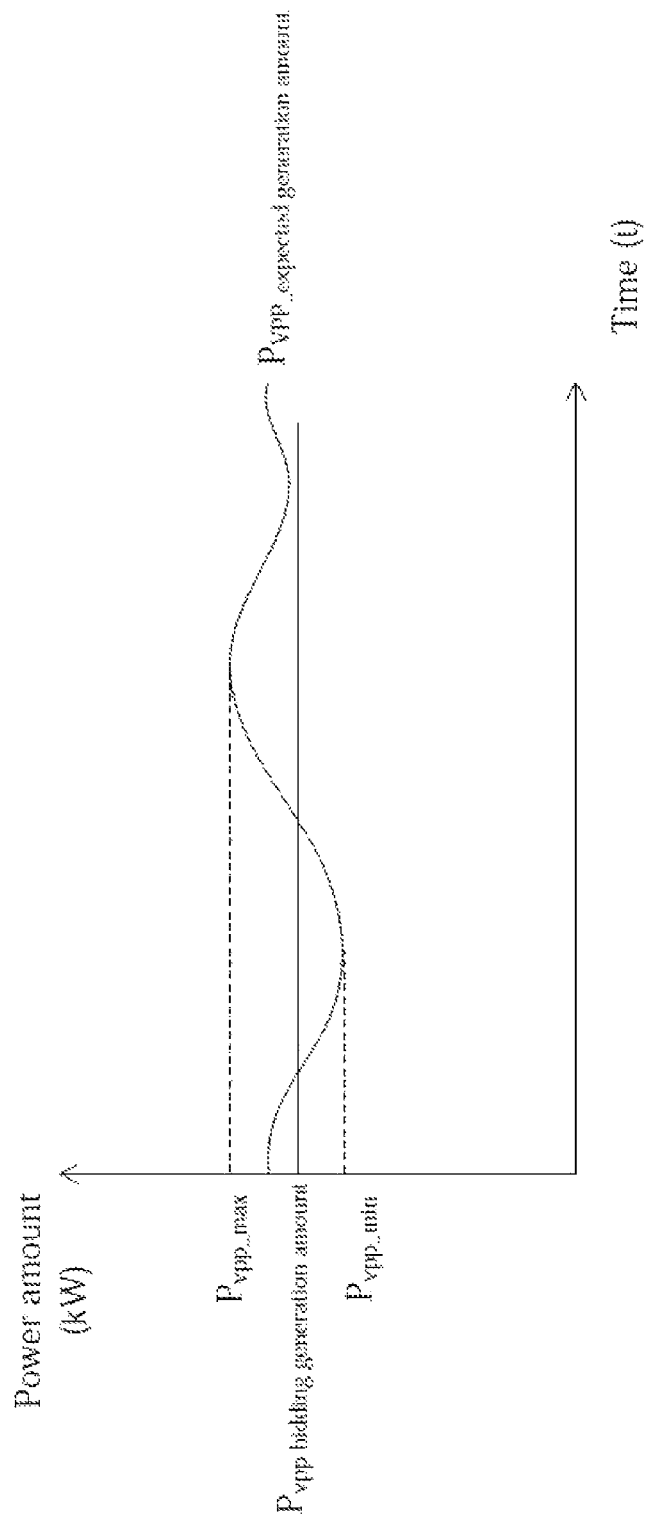
FIG. 9 is a graph showing a VPP expected power generation amount and the VPP bidding power generation amount of the virtual power plant according to an exemplary embodiment of the present invention.

FIG. 8 is a graph showing an expected power generation amount and average generation amount of individual distributed energy resources according to an exemplary embodiment of the present invention, and FIG. 9 is a graph showing a VPP expected power generation amount and the VPP bidding power generation amount of the virtual power plant according to an exemplary embodiment of the present invention.

Referring to FIG. 8 and FIG. 9, the virtual power plant management device 200 may predict an expected power generation amount $P_{DER1\_expected}$ to $P_{DERm\_expected}$ and an average power generation amount $P_{DER1\_average}$ to $P_{DERm\_average}$ of each distributed energy resource by analyzing the characteristics of each of the plurality of distributed energy resources 110-1 to 110-$m$.

And, the virtual power plant management device 200 may derive the amount of power generation of the virtual power plant 100 by summing the expected power generation amount $P_{DER1\_expected}$ to $P_{DERm\_expected}$ or the average power generation amount $P_{DER1\_average}$ to $P_{DERm\_average}$ of a plurality of distributed energy resources 110-1 to 110-$m$.

For example, the virtual power plant management apparatus 200 may derive the VPP expected power generation amount $P_{VPP\_expected}$ generation amount by summing the expected power generation amount $P_{DER1\_expected}$ to $P_{DERm\_expected}$ that the plurality of distributed energy resources 110-1 to 110-$m$ connected to the virtual power plant 100 can generate at a specific point in time or during a bidding period.

Herein, the VPP expected power generation amount $P_{VPP\_expected\ generation\ amount}$ may include the VPP minimum power generation amount $P_{vpp\_min}$ which is the minimum generation amount of the virtual power plant 100 and the VPP maximum power generation amount $P_{vpp\_max}$ which is the maximum generation amount of the virtual power plant 100.

In addition, the virtual power plant management device 200 may determine the VPP bidding power generation amount $P_{vpp\ bidding\ generation\ amount}$ output from the virtual power plant 100 to the power system 10 during a bidding period based on the VPP expected power generation amount $P_{vpp\_expected\ generation\ amount}$.

In this case, the VPP bidding power generation amount $P_{vpp\ bidding\ power\ generation\ amount}$ may have a value between the VPP minimum power generation amount $P_{vpp\_min}$ and the VPP maximum power generation amount $P_{vpp\_max}$. In addition, the VPP bidding power generation $P_{vpp\ bidding\ power\ generation\ amount}$ may be a sum of the average power generation amounts $P_{DER1\_average}$ to $P_{DERm\_average}$ of the plurality of distributed energy resources 110-1 to 110-$m$.

Figure 10:
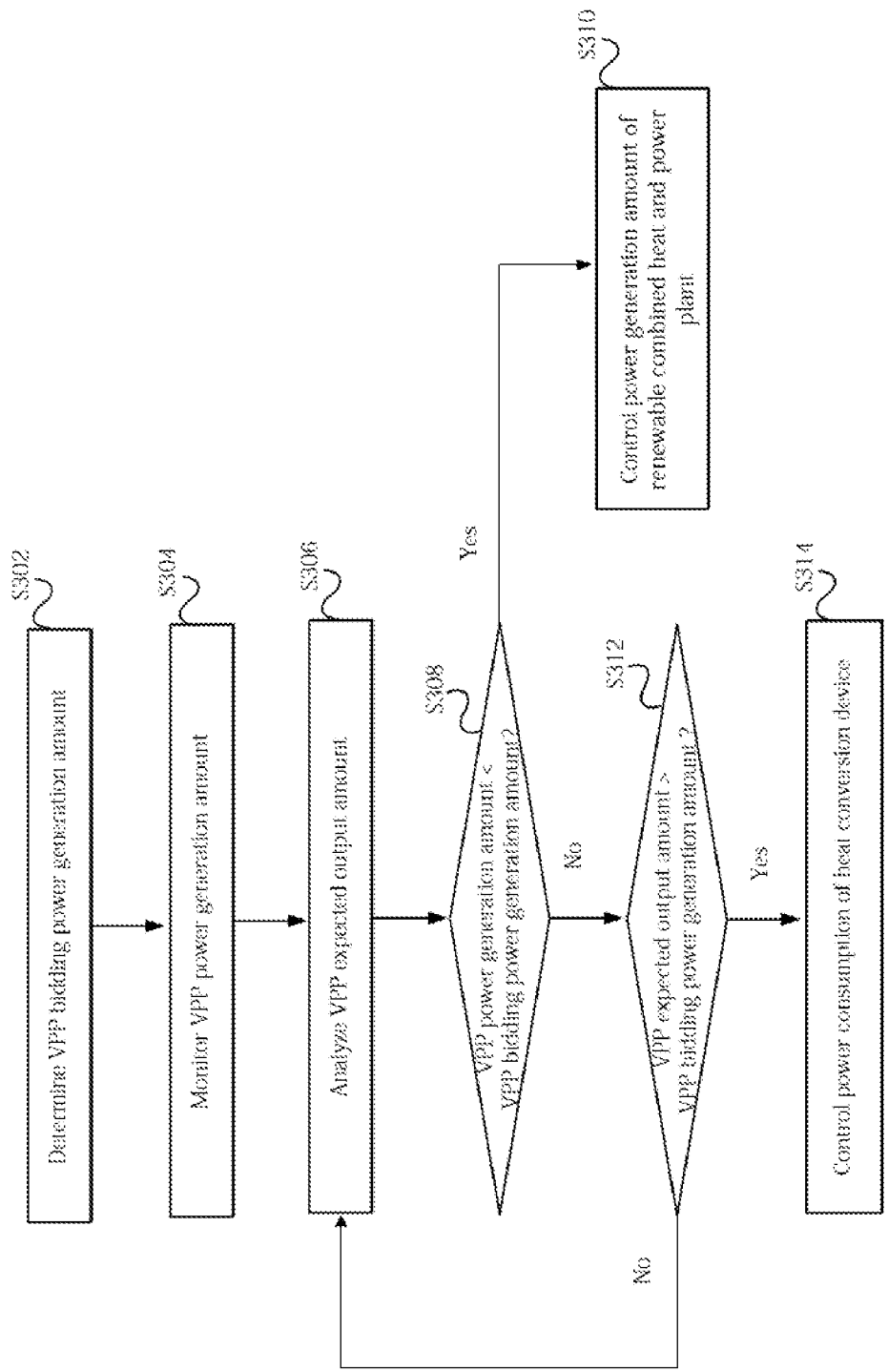
FIG. 10 is a flowchart briefly showing a process of controlling a virtual power plant output adjustment device by comparing a VPP expected output amount and a VPP bidding power generation amount according to an exemplary embodiment of the present invention.

FIG. 10 is a flowchart briefly showing a process of controlling a virtual power plant output adjustment device by comparing a VPP expected output amount and a VPP bidding power generation amount according to an exemplary embodiment of the present invention. Hereinafter, the following flow chart will be described by using the same reference numerals which are attached to components of FIG. 1 to FIG. 3.

Referring to FIG. 10, the virtual power plant management device 200 according to an exemplary embodiment of the present invention may conduct a bidding with the power exchange 20, and determine the VPP bidding power generation amount supplied from the virtual power plant 100 to the power system 10 at step S302. Herein, the VPP bidding power generation amount may include a power supply amount or power output amount supplied from the virtual power plant 100 to the power system 10 during a bidding period.

And, the virtual power plant management device 200 monitors the amount of power generated by the plurality of distributed energy resources 110-1 to 110-$m$ connected to the virtual power plant 100 in real time, and derives the VPP power generation amount generated from the virtual power plant 100 at step S304. Herein, the VPP power generation amount may include the total of the power generation amount each generated from the plurality of distributed energy resources 110-1 to 110-$m$ during a specific time point or a bidding period.

Then, the virtual power plant management device 200 calculates the VPP expected output amount by subtracting the power consumption by the load 120 of the virtual power plant 100 from the VPP power generation amount at step S306. Herein, the VPP expected power generation amount may include a power generation amount that can be generated by the plurality of distributed energy resources 110-1 to 110-$m$ connected to the virtual power plant 100 at a specific time point or during a bidding period.

In addition, the virtual power plant management device 200 may control the operation of the virtual power plant output adjustment device 310 by comparing the VPP power generation amount or the VPP expected output amount with the VPP bidding power generation amount.

For example, when the amount of power generation of the distributed energy resource 110 is reduced and the VPP power generation amount is greater than the VPP bidding power generation amount, the virtual power plant management device 200 may control to increase the amount of power generation or power production of the renewable combined heat and power plant 330 at step S308 and S310.

At this time, even when the power consumption of the load 120 connected to the virtual power plant 100 increases sharply and the VPP expected output amount is smaller than the VPP bidding power generation amount, the power generation of the renewable combined heat and power plant 330 is increased.

And, the virtual power plant management device 200 may control the amount of power generation of the renewable combined heat and power plant 330 in proportion to the difference value between the VPP power generation amount and the VPP bidding power generation amount or the difference value between the VPP expected output amount and the VPP bidding power generation amount.

Further, when the VPP power generation amount or the VPP expected output amount is greater than the VPP bidding power generation amount due to an increase in the amount of power generation of the distributed energy resource 110 or a sharp decrease in the amount of power consumption of the load 120, it can be controlled to increase the power consumption of the heat conversion device 320 at step S312 and S314. At this time, the virtual power plant management device 200 may control the size of the power consumption of the heat conversion device 320 in proportion to the difference value between the VPP power generation amount and the VPP bidding power generation amount or the difference value between the VPP expected output amount and the VPP bidding power generation amount.

Figure 11:
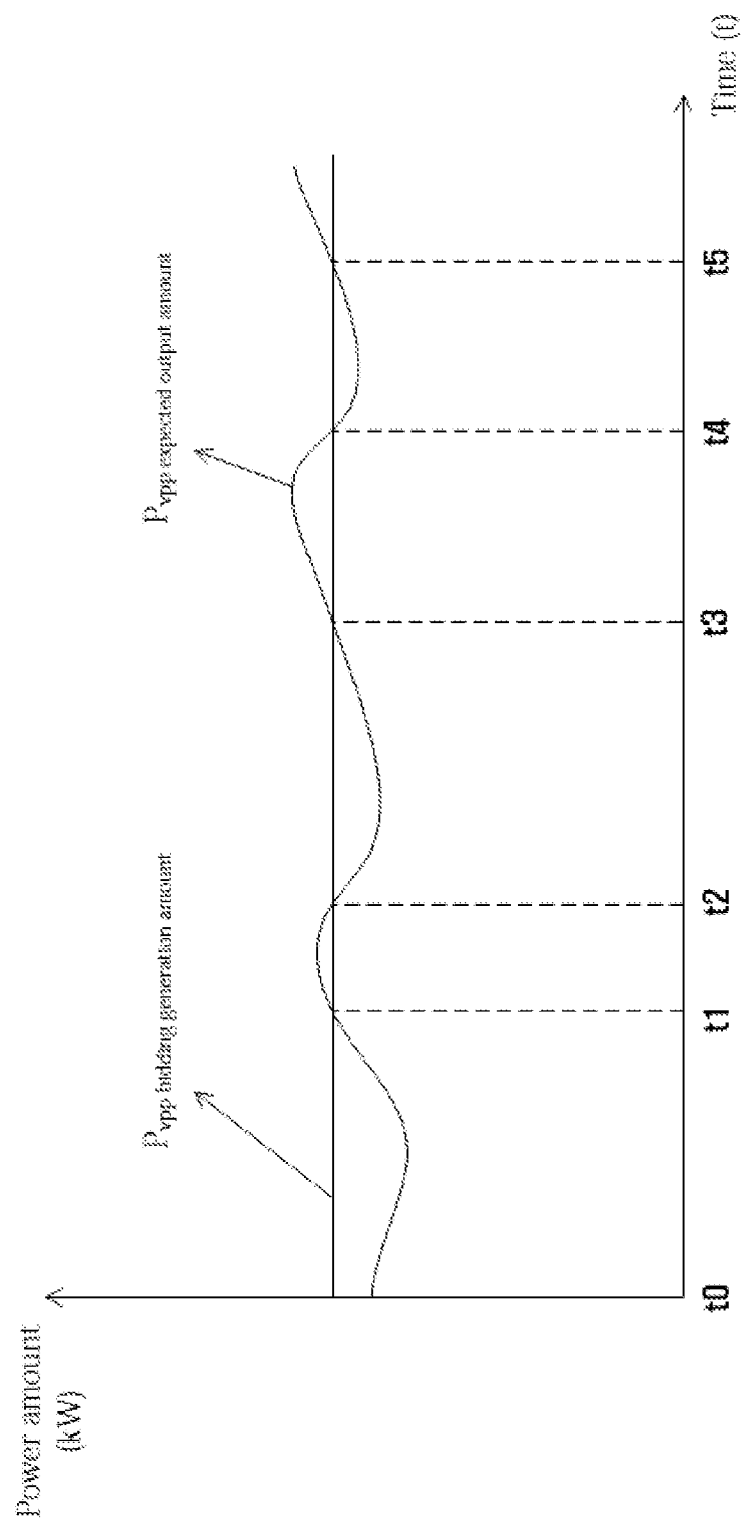
FIG. 11 is a graph showing an example of controlling the virtual power plant output adjustment device by comparing the VPP expected output amount and the VPP bidding power generation amount according to an exemplary embodiment of the present invention.

FIG. 11 is a graph showing an example of controlling the virtual power plant output adjustment device by comparing the VPP expected output amount and the VPP bidding power generation amount according to an exemplary embodiment of the present invention.

Referring to FIG. 11, the virtual power plant management device 200 according to an exemplary embodiment of the present invention may control the power consumption of the heat conversion device 320 and the power generation amount of the renewable combined heat and power plant 330 in real time by comparing the VPP bidding power generation amount $P_{vpp\ bidding\ generation\ amount}$ and the VPP expected output amount $P_{vpp\ expected\ output\ amount}$ in real time.

For example, in the sections t0 to t1, t2 to t3, t4 to t5 in which the VPP expected output amount $P_{vpp\ predicted\ output\ amount}$ is smaller than the VPP bid generation amount $P_{vpp\ bidding\ power\ generation\ amount}$, the generation amount of the renewable combined heat and power plant 330 can be increased.

In addition, the present invention can supplement the insufficient amount of power generation and output of the virtual power plant 100 by supplying the electric power produced in the renewable combined heat and power plant 330 to the virtual power plant 100 or the power system 10.

Further, in the sections t1 to t2, t3 to t4 in which the VPP expected output amount $P_{vpp\ predicted\ output\ amount}$ is larger than the VPP bidding power generation amount $P_{vpp\ bidding\ power\ generation\ amount}$, the surplus power of the virtual power plant 100 can be consumed by adjusting the power consumption of the heat conversion device 320.

Of course, although in the sections t1 to t2, t3 to t4 the VPP expected output amount $P_{vpp\ expected\ output\ amount}$ is larger than the VPP bidding power generation amount $P_{vpp\ bidding\ power\ generation\ amount}$, if the VPP expected output amount is smaller than the VPP bidding power generation amount due to a sharp increase in the power consumption of the load 120, it is possible to control to increase the amount of power generation of the renewable cogeneration power plant at step 330.

Figure 12:
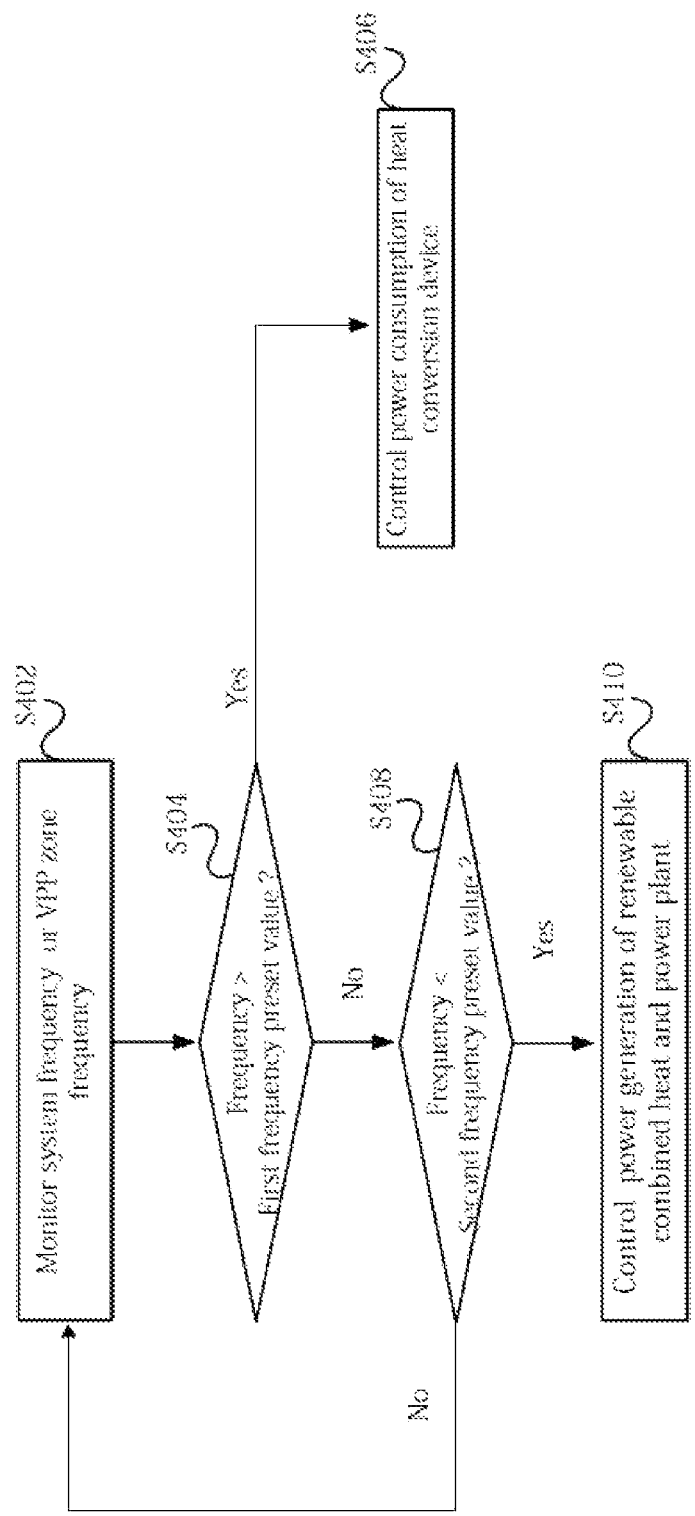
FIG. 12 is a flowchart briefly showing a process of controlling a virtual power plant output adjustment device by monitoring a system frequency of a power system or a zone frequency of a virtual power plant according to an exemplary embodiment of the present invention.

FIG. 12 is a flowchart briefly showing a process of controlling a virtual power plant output adjustment device by monitoring a system frequency of a power system or a zone frequency of a virtual power plant according to an exemplary embodiment of the present invention. Hereinafter, the following flow chart will be described by using the same reference numerals which are attached to components of FIG. 1 to FIG. 3.

Referring to FIG. 12, the virtual power plant management device 200 according to an exemplary embodiment of the present invention may detect a system frequency of the power system 10 or a zone frequency of the virtual power plant 100 in real time, and monitor a change of the frequency at step S402.

In addition, the virtual power plant management device 200 may control the operation of the virtual power plant output adjustment device 310 by comparing the system frequency or the zone frequency with a preset value.

For example, the system frequency of the power system 10 may change abruptly due to a sudden change in the output of the variable power source connected to the power system 10, a generator dropout or a large-scale load surge. In this case, the present invention may compare the system frequency or the zone frequency with a preset value and control the operation of the virtual power plant output adjustment device 310.

And, according to the present invention, the output amount of the virtual power plant 100 can be adjusted through the operation of the virtual power plant output adjustment device 310, and as a result, the system frequency of the power system 10 can be maintained within a predetermined range.

Further, the output of the distributed energy resource 110 connected to the virtual power plant 100 may change abruptly, so that the zone frequency of the virtual power plant 100 may change abruptly. Even at this time, the present invention can control the operation of the virtual power plant output adjustment device 310 by comparing the system frequency or the zone frequency with a preset value. And, according to the present invention, the output of the virtual power plant 100 can be stably maintained through the operation of the virtual power plant output adjustment device 310.

For example, the virtual power plant management device 200 may control to increase the power consumption of the heat conversion device 320 when the system frequency or the zone frequency is greater than a first frequency preset value at steps S404 and S406.

In addition, when the system frequency or the zone frequency is smaller than a second frequency preset value, the virtual power plant management device 200 may control to increase the amount of power generation of the renewable combined heat and power plant 330 at steps S408 and S410.

Of course, the virtual power plant management device 200 may directly compare the system frequency and the zone frequency, and control the operation of the virtual power plant output adjustment device 310 based on the comparison result.

Figure 13:
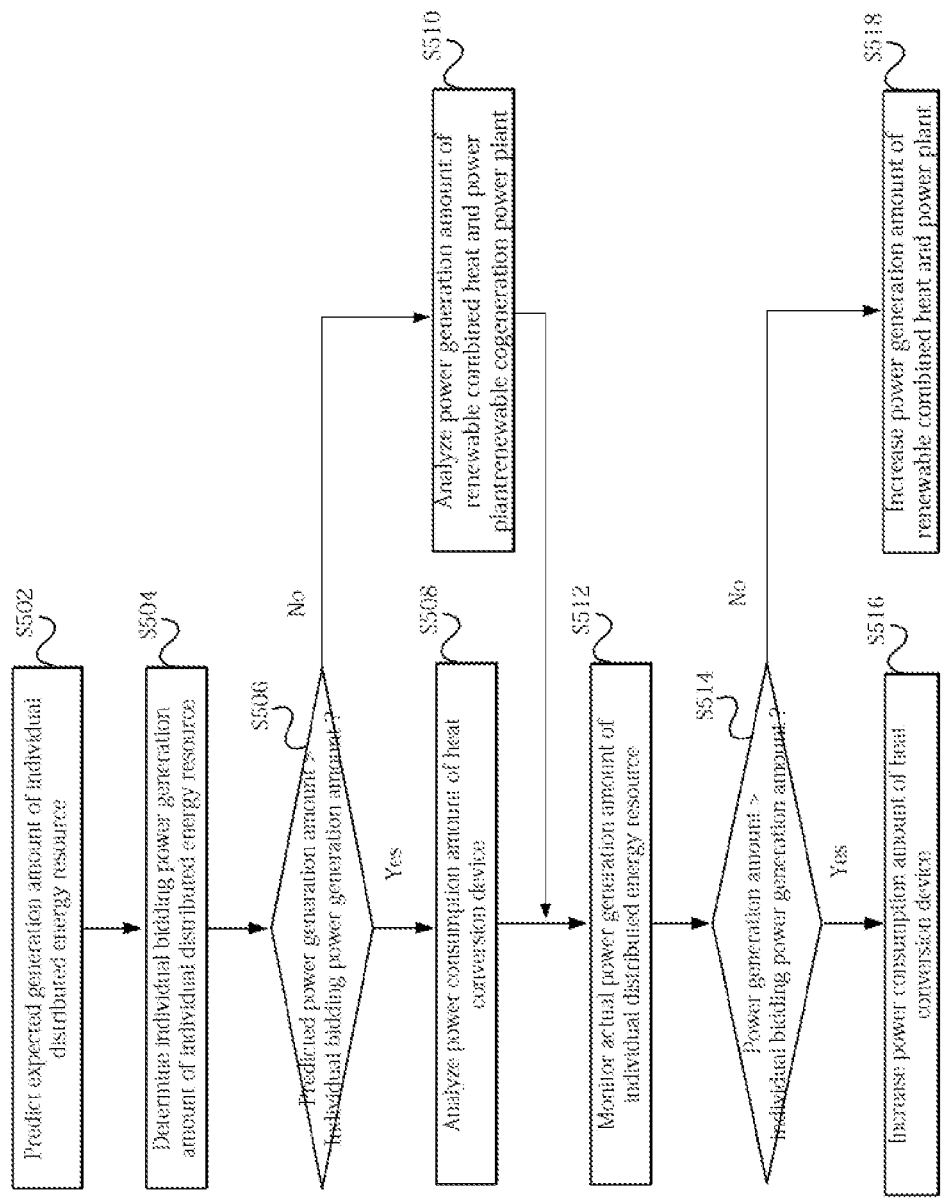
FIG. 13 is a flowchart briefly showing a process of conducting bidding by predicting the amount of generation of individual distributed energy resources and controlling a virtual power plant output adjustment device by monitoring an actual power generation amount of individual distributed energy resources according to an embodiment of the present invention.

FIG. 13 is a flowchart briefly showing a process of conducting bidding by predicting the amount of generation of individual distributed energy resources and controlling a virtual power plant output adjustment device by monitoring an actual power generation amount of individual distributed energy resources according to an embodiment of the present invention. Hereinafter, the following flow chart will be described by using the same reference numerals which are attached to components of FIG. 1 to FIG. 3.

Referring to FIG. 13, the virtual power plant management device 200 according to an exemplary embodiment of the present invention may predict an expected generation amount of the individual distributed energy resource 110 at step S502.

And, the virtual power plant management device 200 may analyze the expected power generation amount of the individual distributed energy resource 110, and within the total power generation that the individual distributed energy resource 110 can generate during the bidding period, it is possible to determine the individual bidding power generation amount of the individual distributed energy resource 110 supplied to the power system 10 at step S504.

In addition, the virtual power plant management device 200 may compare the expected power generation amount of the individual distributed energy resource 110 with the individual bidding power generation amount of the individual distributed energy resource 110, and pre-predict the operation of the virtual power plant output adjustment device 310. And, the virtual power plant management device 200 may pre-analyze the power consumption and power generation of the virtual power plant output adjustment device 310 by using the comparison result between the predicted power generation amount and the individual bidding power generation amount at step S506.

For example, when the expected power generation amount is greater than the individual bidding power generation amount, in order to stabilize the virtual power plant 100 or to keep the output of the individual distributed energy resource 110 constant, it is possible to analyze and predict the size or amount of power consumption by the heat conversion device 320 required to use the surplus power of the individual distributed energy resource 110 at step S508. And, when the expected power generation amount is smaller than the individual bidding power generation amount, to stabilize the virtual power plant 100 or to keep the output of the individual distributed energy resource 110 constant, the size or amount of power generation to be generated by the renewable combined heat and power plant 330 may be analyzed and predicted at step S510.

Further, the virtual power plant management device 200 may monitor the actual amount of power generated by the individual distributed energy resources 110 at step S512. And, the virtual power plant management device 200 compares the actual power generation amount of the individual distributed energy resource 110 with the individual bidding power generation amount of the individual distributed energy resource 110, and based on the comparison result, the virtual power plant output adjustment device 310 operation can be controlled.

For example, when the actual power generation amount of the individual distributed energy resource 110 is greater than the individual bidding power generation amount, it is possible to control to increase the power consumption of the heat conversion device 320 at steps S514 and S516.

Further, when the actual power generation amount of the individual distributed energy resource 110 is smaller than the individual bidding power generation amount, it is possible to control to increase the power generation amount of the renewable combined heat and power plant 330 at step S518.

That is, the present invention monitors the actual power generation amount of the individual distributed energy resource 110 in real time, compares the actual power generation amount of the individual distributed energy resource 110 with the individual bidding power generation amount of the individual distributed energy resource 110, and controls the power consumption of the heat conversion device or the amount of power generation of the renewable cogeneration power plant 330. Therefore, it is possible to keep the output of individual distributed energy resources constant. And, through this, the present invention can provide the same effect that the output of the individual distributed energy resource 110 is flattened and provided to the virtual power plant 100.

In addition, the present invention predicts and analyzes the operation of the virtual power plant output adjustment device 310 in advance by comparing the predicted power generation amount of the individual distributed energy resource 110 and the individual bidding power generation amount, and then controls the operation of the heat conversion device 320 and the renewable combined heat and power plant 330 in real time by comparing the generation amount and the individual bidding generation amount in real time. Therefore, this provides an environment that can more effectively respond to variations in the output of the distributed energy resource.

Further, in the present invention, the bidding period of the individual distributed energy resource 110 may be divided into a plurality of sections, and a section average value of the actual power generation amount of the individual distributed energy resource 110 may be derived for each section. In addition, the present invention can control the operation of the heat conversion device 320 and the renewable combined heat and power plant 330 by comparing the average value of each section for each section with the individual bidding power generation amount.

Of course, in the present invention, the bidding period of the virtual power plant 100 may be divided into a plurality of sections, and a section average value of the actual power generation amount of the virtual power plant 100 may be derived for each section. In addition, the present invention may control the operation of the heat conversion device 320 and the renewable combined heat and power plant 330 by comparing the average value of each section for each section with the VPP bidding power generation amount.

Figure 14:
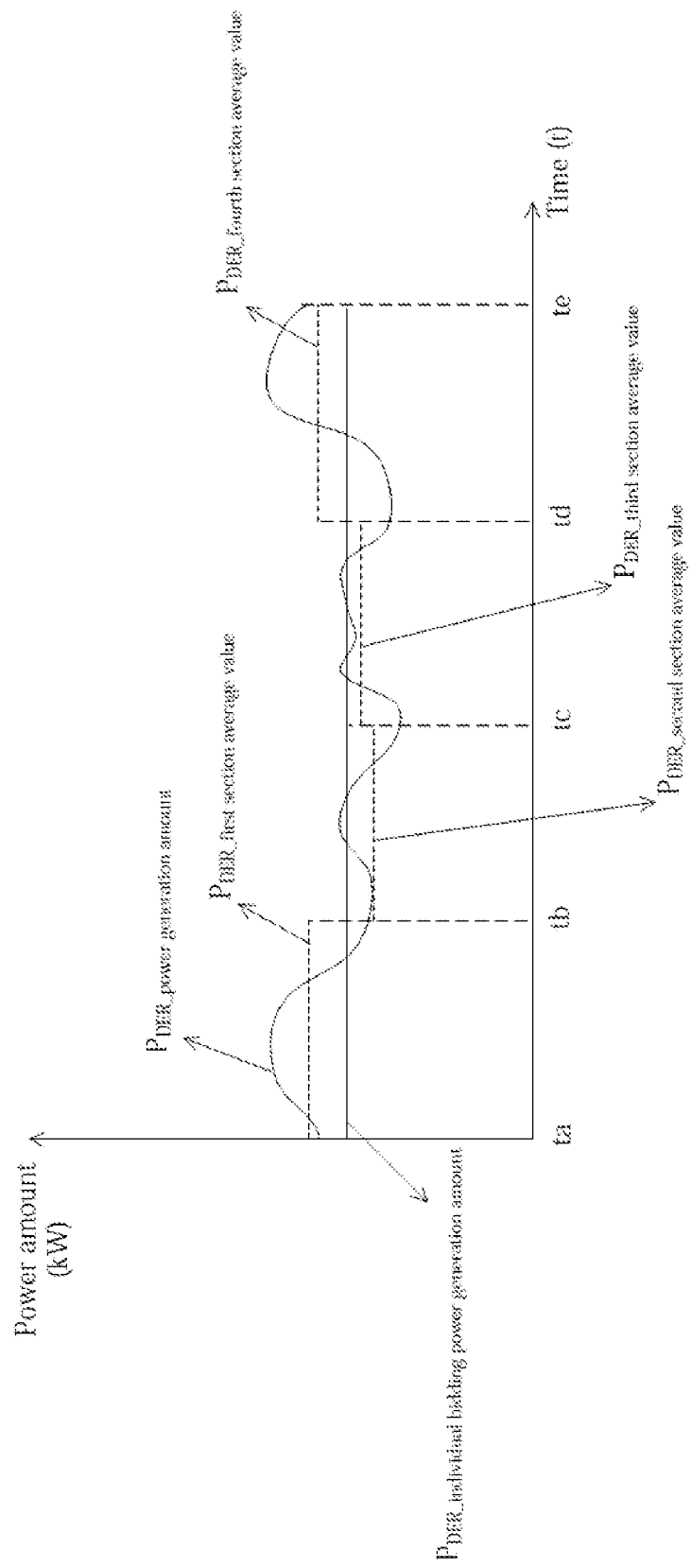
FIG. 14 is a graph showing an example of controlling a virtual power plant output adjustment device by dividing a bidding period into a plurality of sections and monitoring an actual power generation amount of individual distributed energy resources for each section according to an embodiment of the present invention.

FIG. 14 is a graph showing an example of controlling a virtual power plant output adjustment device by dividing a bidding period into a plurality of sections and monitoring an actual power generation amount of individual distributed energy resources for each section according to an embodiment of the present invention.

Referring to FIG. 14, the virtual power plant management device 200 according to an exemplary embodiment of the present invention may divide the bidding period $t_a$ to $t_e$ of the individual distributed energy resources 110 into a plurality of sections. Herein, the plurality of sections may include a first section $t_a$ to $t_b$, a second section $t_b$ to $t_b$, a third section $t_b$ to $t_d$, and a fourth section $t_d$ to $t_e$.

And, the virtual power plant management device 200 according to an exemplary embodiment of the present invention may compare the actual power generation amount $P_{DER\_power\ generation\ amount}$ of the individual distributed energy resource 110 and the individual bidding power generation amount $P_{DER\_individual\ bidding\ power\ generation\ amount}$ of the individual distributed energy resource 110, and control the amount of power consumption or power generation of the virtual power plant output adjustment device 310 in real time based on the comparison result.

Further, the virtual power plant management device 200 according to an exemplary embodiment of the present invention may derive a section average value $P_{DER\_section\ average\ value}$ of the actual power generation amount of the individual distributed energy resource 110 for each section, and control the operation of the virtual power plant output adjustment device 310 by comparing the section average value $P_{DER\_section\ average\ value}$ and the individual bidding power generation amount $P_{DER\_individual\ bidding\ power\ generation\ amount}$.

For example, in the first section $t_a$ to $t_b$ and the fourth section $t_d$ to $t_e$, since a first section average value $P_{DER\_first\ section\ average\ value}$ and a fourth section average value $P_{DER\_fourth\ section\ average\ value}$ are greater than the individual bidding power generation amount $P_{DER\_individual\ bidding\ power\ generation\ amount}$, it is possible to increase the heat production amount of the heat conversion device 320. At this time, the heat production of the heat conversion device 320 may be proportional to the difference between the individual bidding power generation amount $P_{DER\_individual\ bidding\ power\ generation\ amount}$ and the first section average value $P_{DER\_first\ section\ average\ value}$, or be proportional to the difference between the individual bidding power generation amount $P_{DER\_individual\ bidding\ power\ generation\ amount}$ and the average value of the fourth section $P_{DER\_fourth\ section\ average\ value}$.

In addition, in the second section $t_b$ to $t_c$ and the third section $t_c$ to $t_d$, since the second section average value $P_{DER\_second\ section\ average\ value}$ and the third section average value $P_{DER\_third\ section\ average\ value}$ are smaller than the individual bidding power generation amount $P_{DER\_individual\ bidding\ power\ generation\ amount}$, it is possible to increase the amount of power generation of the renewable combined heat and power plant 330.

In this case, the amount of power generation of the renewable combined heat and power plant 330 may be proportional to the difference between the individual bidding power generation amount $P_{DER\_individual\ bidding\ power\ generation\ amount}$ and the second section average value $P_{DER\_second\ section\ average\ value}$. In addition, the amount of power generation of the renewable combined heat and power plant 330 may be proportional to the difference between the individual bidding power generation amount $P_{DER\_individual\ bidding\ power\ generation\ amount}$ and the third section average value $P_{DER\_third\ section\ average\ value}$.

As described above, the virtual power plant system and the virtual power plant operation method according to an exemplary embodiment of the present invention connects the virtual power plant output adjustment device to the virtual power plant, and adjusts the output variation and error of the virtual power plant due to the output variation of the distributed energy resources through the virtual power plant output adjustment device, thereby stabilizing the output of the virtual power plant.

Further, according to the present invention, the virtual power plant output adjustment device can produce heat energy by using the surplus power that is overproduced by the output fluctuation of the distributed energy resource. Through this, it is possible to minimize the output fluctuation of the virtual power plant due to the output fluctuation of the distributed energy resource, which is difficult to control the output such as a renewable energy source, and to maintain the output of the virtual power plant stably.

Further, the present invention provides an environment in which the waste of energy sources can be prevented by storing the heat energy produced in the virtual power plant output adjustment device in a large capacity and providing it to the heat load.

Further, the present invention may connect the renewable combined heat and power plant to the virtual power plant as a distributed energy resource, adjust the amount of power generation of the renewable combined heat and power plant in response to output fluctuations of the distributed energy resources, and supplement the insufficient output of the virtual power plant with the power generated in the renewable combined heat and power plant. Through this, it provides an environment in which the output of the virtual power plant can be stably maintained by minimizing the output shortage of the virtual power plant caused by distributed energy resources that are difficult to control output such as new and renewable energy sources and the output fluctuation of the virtual power plant.

Further, the present invention may analyze the predicted power generation amount of each individual distributed energy resource, derive the VPP predicted power generation amount by summing the predicted power generation amount of the distributed energy resources, and derive the VPP bidding power generation amount based on the VPP predicted power generation amount. Through this, the present invention provides an environment in which the optimal bidding power generation amount can be effectively determined.

Further, the present invention may derive the VPP power generation amount generated in real time within the virtual power plant by monitoring the amount of power generated from a plurality of distributed energy resources, and adjust the power consumption of the heat conversion device or the power generation of the renewable combined heat and power plant by comparing the VPP power generation amount and VPP bidding power generation amount. Through this, the present invention provides an environment capable of stably maintaining the output of the virtual power plant.

Further, the present invention may detect the system frequency of the power system or the zone frequency of the virtual power plant in real time, and control the power consumption of the heat conversion device or the amount of power generation of the renewable combined heat and power plant based on the detected frequency. Through this, the present invention provides an environment capable of preventing a sudden change in the system frequency of the power system and a sudden change in the zone frequency of the virtual power plant due to output fluctuations of distributed energy resources, which are variable power sources.

Further, the present invention may monitor the amount of power generation of individual distributed energy resources in real time, and control the power consumption of the heat conversion device or the power generation amount of the renewable combined heat and power plant by comparing the power generation amount of the individual distributed energy resources with the individual bidding power generation amount of the individual distributed energy resources. Through this, the present invention maintains the output of the individual distributed energy resource constant, and the output of the individual distributed energy resource is flattened and provided to the virtual power plant.

Further, the present invention may determine the individual bidding power generation amount of the individual distributed energy resource by predicting the power generation amount of individual distributed energy resources during the bidding period, compare the individual bidding power generation amount and the power generation amount of the individual distributed energy resource in real time, based on this, and control the power consumption of the heat conversion device or control the amount of power generated in the renewable combined heat and power plant in real time. Through this, the present invention provides an environment in which the output amount of individual distributed energy resources can be adjusted to the amount of individual bidding power generation during the bidding period.

Further, the present invention controls the operation of the virtual power plant output adjustment device based on at least one of the VPP bidding power generation amount with the power exchange, the power generation amount of individual distributed energy resources, system information of the power system, or a control signal received from the power exchange. Through this, the present invention provides an environment capable of stably maintaining the output of the virtual power plant and stably maintaining the power system.

The foregoing exemplary embodiments of the present invention are not implemented only by an apparatus and a method, and therefore, may be realized by programs realizing functions corresponding to the configuration of the exemplary embodiment of the present invention or recording media on which the programs are recorded. Such a recording medium may be executed not only in the server but also in the user terminal.

Although the exemplary embodiment of the present invention has been described in detail hereinabove, the scope of the present invention is not limited thereto. That is, several modifications and alterations made by those skilled in the art using a basic concept of the present invention as defined in the claims fall within the scope of the present invention.

What is claimed is:

1. A virtual power plant system using a heat conversion device, comprising:
a plurality of distributed energy resources connected to a virtual power plant;
a virtual power plant output adjustment device connected to the virtual power plant and including a heat conversion device that receives power generated from the plurality of distributed energy resources and converts the power into thermal energy; and
a virtual power plant management device configured to conduct a bidding by predicting an expected power generation amount of the plurality of distributed energy resources, analyze output of the virtual power plant due to output of the plurality of distributed energy resources, and stabilize the output of the virtual power plant by controlling a power consumption amount of the virtual power plant output adjustment device based on the analysis result,
wherein the virtual power plant management device determines an individual bidding power generation amount of an individual distributed energy resource by predicting an amount of power generated by each distributed energy resource during a bidding period, and adjusts power consumption of the heat conversion device by comparing the individual bidding power generation amount and an actual power generation amount of the individual distributed energy resource, and
wherein the virtual power plant management device divides the bidding period into a plurality of sections, derives a section average value of the actual power generation amount of individual distributed energy resources for each section, and controls power consumption of the heat conversion device by comparing the section average value of each section for each section with the variable power source.

2. The system of claim 1, wherein:
the virtual power plant management device
analyzes an expected power generation amount of each distributed energy resource based on characteristics and power generation capacity of each distributed energy resource, derives a virtual power plant (VPP) expected power generation amount generated in the virtual power plant by summing the expected power generation amount of the plurality of distributed energy resources, and determines a VPP bidding power generation amount based on the VPP expected power generation amount.

3. The system of claim 2, wherein:
the virtual power plant management device
derives a VPP power generation amount generated in the virtual power plant by monitoring an amount of power generated by the plurality of distributed energy resources in real time, calculates a VPP expected output amount by subtracting a power consumption consumed by a load of the virtual power plant from the VPP power generation amount, and controls a power consumption of the heat conversion device by comparing the VPP expected output amount and the VPP bidding power generation amount.

4. The system of claim 3, wherein:
the virtual power plant management device
increases the power consumption of the heat conversion device by the difference between the VPP expected output amount and the VPP bidding power generation amount if the VPP expected output amount is greater than the VPP bidding power generation amount, and
stops heat production of the heat conversion device if the VPP expected output amount is less than the VPP bidding power generation amount.

5. The system of claim 1, wherein:
the virtual power plant management device detects a zone frequency of the virtual power plant in real time, and determines power consumption of the heat conversion device using the detected zone frequency.

6. The system of claim 1, wherein:
the virtual power plant management device monitors an amount of power generation of individual distributed energy resource in real time, and adjusts power consumption of the heat conversion device in real time based on the amount of power generation of the individual distributed energy resource.

7. The system of claim 1, wherein:
the virtual power plant management device increases the power consumption of the heat conversion device in proportion to the difference between the actual power generation amount and the individual bidding power generation amount if the actual power generation amount of the individual distributed energy resource exceeds the individual bidding power generation amount during the bidding period.

8. A virtual power plant operation method using a heat conversion device, the method comprising:
predicting an amount of power generation of distributed energy resource connected to the virtual power plant;
analyzing output of the virtual power plant based on the amount of power generation of the distributed energy resource;
stabilizing the output of the virtual power plant by adjusting heat production amount of the heat conversion device connected to the virtual power plant based on the analysis result;
determining an individual bidding power generation amount of an individual distributed energy resource by predicting power generation amount of the distributed energy resource generated during the bidding period;
monitoring amount of power generated by the individual distributed energy resource; and
adjusting heat production amount of the heat conversion device by comparing the generation amount of the individual distributed energy resource and the individual bidding power generation amount so that the output value by the individual distributed energy resource during the bidding period maintains the individual bidding power generation amount, wherein the adjusting heat production amount of the heat conversion device includes:

dividing the bidding period into a plurality of sections;

deriving a section average value of an actual power generation amount of each distributed energy resource for each section, and controlling the heat production amount of the heat conversion device by comparing the section average value of each section for each of the plurality of sections with the individual bidding power generation amount.

9. The method of claim 8, wherein:

the stabilizing output of the virtual power plant adjusts the heat production amount of the heat conversion device based on at least one of a virtual power plant (VPP) bidding power generation amount of the virtual power plant, a power generation amount of individual distributed energy resources, system information of a power system, or control signal received from outside of the virtual power plant.

10. The method of claim 8, wherein:

the stabilizing output of the virtual power plant includes detecting a system frequency of the power system in real time, and adjusting heat production amount of the heat conversion device in real time based on the system frequency.

11. The method of claim 8, wherein:

the stabilizing output of the virtual power plant includes detecting a zone frequency of the virtual power plant in real time, and adjusting heat production amount of the heat conversion device in real time based on the zone frequency.

12. The method of claim 8, further comprising analyzing a power generation amount of individual distributed energy resource in real time, and adjusting heat production amount of the heat conversion device in real time based on the power generation amount of the individual distributed energy resource.

13. The method of claim 8, wherein:

the adjusting heat production amount of the heat conversion device increases the heat production amount of the heat conversion device in proportion to the difference between the power generation amount and the individual bidding power generation amount if the amount of power generated by the individual distributed energy generation exceeds the individual bidding power generation amount during the bidding period.

14. A virtual power plant operation method using a heat conversion device, the method comprising:

determining an individual bidding power generation amount of an individual distributed energy resource by predicting power generation amount of the distributed energy resource generated during the bidding period;

monitoring amount of power generated by the individual distributed energy resource; and adjusting heat production amount of the heat conversion device by comparing the generation amount of the individual distributed energy resource and the individual bidding power generation amount so that the output value by the individual distributed energy resource during the bidding period maintains the individual bidding power generation amount, wherein the adjusting heat production amount of the heat conversion device includes:

dividing the bidding period into a plurality of sections;

deriving a section average value of an actual power generation amount of each distributed energy resource for each section, and controlling the heat production amount of the heat conversion device by comparing the section average value of each section for each of the plurality of sections with the individual bidding power generation amount, deriving a virtual power plant (VPP) power generation amount by monitoring a power generation amount produced by a plurality of distributed energy resources connected to a virtual power plant;

calculating a VPP expected output amount by subtracting power consumption from load of the virtual power plant from the VPP power generation; and controlling a heat production amount of the heat conversion device by comparing the VPP expected output amount and the VPP bidding power generation amount.

* * * * *